United States Patent
Zhang et al.

(10) Patent No.: US 11,829,998 B2
(45) Date of Patent: Nov. 28, 2023

(54) AUTHENTICATED DATA FEED FOR BLOCKCHAINS

(71) Applicant: Cornell University, Ithaca, NY (US)

(72) Inventors: Fan Zhang, Ithaca, NY (US); Ethan Cecchetti, Ithaca, NY (US); Kyle Croman, Sudbury, MA (US); Ari Juels, New York, NY (US); Runting Shi, Ithaca, NY (US)

(73) Assignee: Cornell University, Ithaca, NY (US)

( * ) Notice: Subject to any disclaimer, the term of this patent is extended or adjusted under 35 U.S.C. 154(b) by 1678 days.

(21) Appl. No.: 15/615,216

(22) Filed: Jun. 6, 2017

(65) Prior Publication Data
US 2017/0352027 A1   Dec. 7, 2017

Related U.S. Application Data

(60) Provisional application No. 62/346,604, filed on Jun. 7, 2016.

(51) Int. Cl.
   *G06Q 20/36*   (2012.01)
   *H04L 9/32*    (2006.01)
   (Continued)

(52) U.S. Cl.
   CPC ....... *G06Q 20/3678* (2013.01); *H04L 9/0825* (2013.01); *H04L 9/3247* (2013.01);
   (Continued)

(58) Field of Classification Search
   CPC ............ G06Q 20/3678; G06Q 2220/00; H04L 9/0825; H04L 9/3247; H04L 2209/38; H04L 2209/56; H04L 2209/76
   (Continued)

(56) References Cited

U.S. PATENT DOCUMENTS

| | | | |
|---|---|---|---|
| 9,584,517 B1* | 2/2017 | Roth | G06F 21/6209 |
| 2002/0010798 A1* | 1/2002 | Ben-Shaul | H04L 67/1021 |
| | | | 709/247 |

(Continued)

FOREIGN PATENT DOCUMENTS

| | | |
|---|---|---|
| WO | 2015116998 A2 | 8/2015 |
| WO | 2017027900 A1 | 2/2017 |
| WO | 2017044554 A1 | 3/2017 |

OTHER PUBLICATIONS

Jay Cassano, What Are Smart Contracts? Cryptocurrency's Killer App, 2014, fastcompany.com, archived May 2020 (Year: 2014).*

(Continued)

*Primary Examiner* — Patrick McAtee
*Assistant Examiner* — Zesheng Xiao
(74) *Attorney, Agent, or Firm* — Ryan, Mason & Lewis, LLP

(57) ABSTRACT

An apparatus in one embodiment comprises a processing platform having at least one processing device. The processing platform implements a trusted bridge configured for at least temporary coupling between one or more data sources and a smart contract program of a blockchain. The trusted bridge comprises a secure enclave component and a relay component. Data obtained from a given one of the data sources via the relay component of the trusted bridge is authenticated in the secure enclave component of the trusted bridge. Information based at least in part on the data authenticated in the secure enclave component of the trusted bridge is provided to the smart contract program of the blockchain via the relay component of the trusted bridge. The secure enclave component illustratively receives a request for authenticated data from the blockchain smart contract program via the relay component, and responds to the request via the relay component.

26 Claims, 13 Drawing Sheets

(51) Int. Cl.
H04L 9/08 (2006.01)
H04L 9/00 (2022.01)
(52) U.S. Cl.
CPC ............ G06Q 2220/00 (2013.01); H04L 9/50 (2022.05); H04L 2209/56 (2013.01); H04L 2209/76 (2013.01)
(58) Field of Classification Search
USPC .......................................................... 705/67
See application file for complete search history.

(56) References Cited

U.S. PATENT DOCUMENTS

| | | | |
|---|---|---|---|
| 2009/0100041 | A1 | 4/2009 | Wilson |
| 2011/0184910 | A1 | 7/2011 | Love et al. |
| 2015/0347768 | A1* | 12/2015 | Martin ................ G06F 21/10 726/1 |
| 2016/0036826 | A1 | 2/2016 | Pogorelik et al. |
| 2016/0149912 | A1 | 5/2016 | Scott-Nash et al. |
| 2016/0260169 | A1 | 9/2016 | Arnold et al. |
| 2016/0283920 | A1 | 9/2016 | Fisher et al. |
| 2016/0292396 | A1 | 10/2016 | Akerwall |
| 2016/0300234 | A1 | 10/2016 | Moss-Pultz et al. |
| 2016/0321675 | A1 | 11/2016 | McCoy et al. |
| 2017/0048235 | A1 | 2/2017 | Lohe et al. |
| 2017/0083860 | A1 | 3/2017 | Sriram et al. |
| 2017/0085545 | A1 | 3/2017 | Lohe et al. |
| 2017/0091397 | A1 | 3/2017 | Shah |
| 2017/0104597 | A1 | 4/2017 | Negi et al. |
| 2017/0109735 | A1 | 4/2017 | Sheng et al. |

OTHER PUBLICATIONS coinmarketcap.com, "Ethereum (ETH)," http://coinmarketcap.com/currencies/ethereum, 2017, 8 pages.
augur.net, "Decentralized Prediction Markets | Augur Project," http://www.augur.net/, 2016, 8 pages.
steampowered.com, "Welcome to Steam," http://store.steampowered.com/, 2017, 11 pages.
tlsnotary.org, "TLSNotary—A Mechanism for Independently Audited https Sessions," https://tlsnotary.org/TLSNotary.pdf, Sep. 10, 2014, 10 pages.
slashdot.org, "Cornell Researchers Unveil a Virtual Notary," www.tech.slashdot.org/story/13/06/20/1747259/cornell-researchers-unveil-a-virtual-notary, Jun. 20, 2013, 1 page.
oraclize.it, "Blockchain Oracle Service, Enabling Data-Rich Smart Contracts," www.oraclize.it, Feb. 2016, 3 pages.
I. Anati et al., "Innovative Technology for CPU Based Attestation and Sealing," Proceedings of the 2nd International Workshop on Hardware and Architectural Support for Security and Privacy (HASP), 2013, 7 pages, vol. 13.
msbed.org, mbed TLS (formerly known as PolarSSL) Makes it Trivially Easy for Developers to Include Cryptographic and SSL/TLS Capabilities in Their (Embedded) Products, Facilitating this Functionality with a Minimal Coding Footprint, https://tls.mbed.org/, 2016, 1 page.
A. Baumann et al., "Shielding Applications from an Untrusted Cloud with Haven," 11th Usenix Symposium on Operating Systems Design and Implementation (OSDI), Oct. 6-8, 2014, pp. 267-283.
J. Bonneau et al., "On Bitcoin as a Public Randomness Source," https://eprint.iacr.org/2015/1015.pdf, 2015, 32 pages.
E. Brickell et al., "Enhanced Privacy ID from Bilinear Pairing," IEEE Second International Conference on Social Computing (SocialCom), Aug. 20-22, 2010, 23 pages.
ethereum.org, "SchellingCoin: A Minimal-Trust Universal Data Feed," https://blog.ethereum.org/2014/03/28/schellingcoin-a-minimal-trust-universal-data-feed/, Mar. 28, 2014, 4 pages.
github.com, "White Paper: A Next-Generation Smart Contract and Decentralized Application Platform," https://github.com/ethereum/wiki/wiki/White Paper, 2014, 26 pages.
Ran Canetti, "Universally Composable Security: A New Paradigm for Cryptographic Protocols," Proceedings of the 42nd IEEE Symposium on Foundations of Computer Science (FOCS), Oct. 14-17, 2001, 10 pages.
R. Canetti et al., "Universally Composable Security with Global Setup," Theory of Cryptography (TCC), Lecture Notes in Computer Science, 2007, pp. 61-85, vol. 4392.
R. Canetti et al., "Universal Composition with Joint State," Advances in Cryptology (CRYPTO), Lecture Notes in Computer Science, 2003, pp. 265-281, vol. 2729.
V. Costan et al., "Intel SGX Explained," http://eprint.iacr.org/, Report 2016/086, 2016, 118 pages.
K. Croman et al., "On Scaling Decentralized Blockchains (A Position Paper)," In Bitcoin Workshop, 2016, 16 pages.
github.com, "Ethereum / Go-Ethereum," https://github.com/ethereum/go-ethereum, 2017, 7 pages.
Gideon Greenspan, "Why Many Smart Contract Use Cases are Simply Impossible," http://www.coindesk.com/three-smart-contract-misconceptions/, Apr. 17, 2016, 5 pages.
Intel, "Intel Software Guard Extensions Programming Reference," Ref. No. 329298-002US, Oct. 2014, 186 pages.
Intel.com, "Intel Software Development Tools—Homepage: Intel High Performance Computing Spring Webinar Series (Online)," https://software.intel.com/sites/products/sgx-sdx-users-guide-windows, 2015, 3 pages.
Intel.com, "Intel Software Guard Extensions (Intel SGX) SDK," https://software.intel.com/en-us-sgx-sdk, 2015, 1 page.
M. Jakobsson et al., "Designated Verifier Proofs and Their Applications," Advances in Cryptology, Lecture Notes in Computer Science, May 12-16, 1996, pp. 143-154, vol. 1070.
A. Juels, "The Ring of Gyges: Investigating the Future of Criminal Smart Contracts," Proceedings of the ACM SIGSAC Conference on Computer and Communications Security (CCS), Oct. 24-28, 2016, pp. 283-295.
virtual-notary.org, "Welcome to Virtual-Notary—A Free and Secure Electronic Attestation Service," http://virtual-notary.org/, 2016, 3 pages.
A. Kosba et al., "Hawk: The Blockchain Model of Cryptography and Privacy-Preserving Smart Contracts," IEEE Symposium on Security and Privacy (SP), May 22-26, 2016, 31 pages.
F. McKeen et al., "Innovative Instructions and Software Model for Isolated Execution," Proceedings of the 2nd International Workshop on Hardware and Architectural Support for Security and Privacy (HASP), Article No. 10, Jun. 23-24, 2013, 8 pages.
Satoshi Nakamoto, "Bitcoin: A Peer-to-Peer Electronic Cash System," 2008, 9 pages.
M. Hoekstra et al., "Using Innovative Instructions to Create Trustworthy Software Solutions," Proceedings of the 2nd International Workshop on Hardware and Architectural Support for Security and Privacy (HASP), Article No. 11, Jun. 23-24, 2013, 8 pages.
Xiaoyu Ruan, "Platform Embedded Security Technology Revealed: Safeguarding the Future of Computing with Intel Embedded Security and Management Engine," Apress, 2014, 24 pages.
F. Schuster et al., "VC3: Trustworthy Data Analytics in the Cloud Using SGX," IEEE Symposium on Security and Privacy (SP), May 17-21, 2015, pp. 38-54.
Kyle Torpey, "The Conceptual Godfather of Augur Thinks the Project Will Fail," www.coingecko.com/buzz/augur-conceptual-godfather-thinks-project-will-fail, Aug. 5, 2015, 6 pages.
Dr. Gavin Wood, "Ethereum: A Secure Decentralised Generalised Transaction Ledger—EIP-150 Revision," Jul. 14, 2014, 32 pages.
Y. Xu et al., "Controlled-Channel Attacks: Deterministic Side Channels for Untrusted Operating Systems," IEEE Symposium on Security and Privacy (SP), May 2015, pp. 640-656.
ethereum.stackexchange.com, "Contracts as Data Feed?," ethereum.stackexchange.com/questions/2156/contracts-as-data-feed-2168, Mar. 19, 2016, 1 page.
S. Eskandari et al., "On the Feasibility of Decentralized Derivatives Markets," 1st Workshop on Trusted Smart Contract in Association with Financial Cryptography, Apr. 7, 2017, 16 pages.

(56) References Cited

OTHER PUBLICATIONS

A. Biryukov et al., "Findel: Secure Derivative Contracts for Ethereum," 1st Workshop on Trusted Smart Contracts (in Association with Financial Cryptography and Data Security 2017), Apr. 7, 2017, 15 pages.
ethereum.stackexchange.com, "How Does Oraclize Handle the TLSnotary Secret?," ethereum.stackexchange.com/questions/201/how-does-oraclize-handle-the-tlsnotary-, Apr. 13, 2017, 2 pages.
blockchainhub.net, "Blockchain Oracles—BlockchainHub: Smart Contract Oracles," blockchainhub.net/blockchain-oracles/, 2016, 3 pages.
oraclize.it, "Oraclize Documentation," www.docs.oraclize.it, May 31, 2017, 10 pages.
mint.com, "Manage Your Money Like Never Before," www.mint.com/how-mint-works/security, 2017, 1 page.
Apple, "iOS Security, iOS 10," Mar. 2017, 68 pages.
M. Milutinovic et al., "Proof of Luck: an Efficient Blockchain Consensus Protocol," SysTEX, Dec. 12-16, 2016, 6 pages.
Reality Keys, "About Reality Keys," www.realitykeys.com/about, 2016, 1 page.
F. Zhang et al., "REM: Resource-Efficient Mining for Blockchains," IACR Cryptology ePrint Archive, Mar. 21, 2017, 27 pages.
F. Tramer et al., "Sealed-Glass Proofs: Using Transparent Enclaves to Prove and Sell Knowledge," Cryptology ePrint Archive: Report 2016/635, Aug. 16, 2016, 16 pages.
software.intel.com, "The Second Coming of Blockchain," www.software.intel.com/en-us/blogs/2017/02/14/the-second-coming-of-blockchain, Feb. 14, 2017, 2 pages.
arm.com, "Products | TrustZone—Arm: A System-Wide Approach to Security," www.arm.com/products/security-on-arm/trustzone, 2017, 5 pages.

\* cited by examiner

FIG. 4

$\mathcal{T}_{Off}$: abstraction for off-chain TCB

Initialize(void):
  (pk, sk) := $\Sigma$.KeyGen($1^\lambda$)
  Output pk

Resume(req):
  Assert $\mathcal{O}$Auth(req)
  resp := $f$(req)
  $\sigma$ := $\Sigma$.Sign(sk, (req, resp))
  Output ((req, resp), $\sigma$)

$\mathcal{T}_{On}$: abstraction for on-chain TCB

Request(req):
  Send (req) to $\mathcal{T}_{Off}$

Deliver(req, resp, $\sigma$):
  $\Sigma$.Verify((req, resp), $\sigma$)
  // can now use resp as trusted

FIG. 5

User: offline verifcation of SGX attestation

*Inputs*: $pk_{sgx}$, $pk_{Off}$, $\mathcal{T}_{Off}$, $\sigma_{att}$

Verify:
Assert $pk_{Off}$ is the expected enclave code
Assert $\Sigma_{sgx}$.Verify($pk_{sgx}$, $\sigma_{att}$, ($\mathcal{T}_{Off}$, $pk_{Off}$))
Assert $\mathcal{T}_{On}$ is correct and parametrized with $pk_{Off}$
// *now okay to rely on* $\mathcal{T}_{On}$

FIG. 6

Town Crier blockchain contract $C_{TC}$ with fees

Initialize: Counter := 0

Request: On recv (params, callback, \$f, \$g_{req}) from some $C_U$:
    Assert $\$G_{min} \leq \$f \leq \$G_{max}$
    id := Counter; Counter := Counter + 1
    Store (id, params, callback, \$f, $C_U$) // $msg.m_1$
    // \$f held by contract

Deliver: On recv (id, params, data, \$g_{dvr}) from $\mathcal{W}_{TC}$ :
  (1) If isCanceled[id] and not isDelivered[id]
       Set isDelivered[id]
  (2)     Send $\$G_\phi$ to $\mathcal{W}_{TC}$
      Return
      Retrieve stored (id, params', callback, \$f, _)
        // abort if not found
      Assert params = params' and $\$f \leq \$g_{dvr}$
        and isDelivered[id] not set
    Set isDelievered[id]
  (3) Send \$f to $\mathcal{W}_{TC}$
      Set $\$g_{clbk} := \$f - \$G_{min}$
  (4) Call callback(data) with gas $\$g_{clbk}$ // $msg.m_4$

Cancel: On recv (id, $\$g_{cncl}$) from $C_U$:
    Retrieve stored (id, _, _, \$f; $C'_U$)
      // abort if not found
    Assert $C_U = C'_U$ and $\$f \geq \$G_\phi$
      and isDelivered[id] not set
      and isCanceled[id] not set
    Set isCanceled[id]
  (5) Send ($\$f - \$G_\phi$) to $C_U$ // hold $\$G_\phi$

FIG. 7

Program for Town Crier Relay $\mathcal{R}$

Initialize:
    Send init to $\mathcal{F}_{sgx}[\text{prog}_{encl}, \mathcal{R}]$
    On recv $(pk_{TC}, \sigma_{att})$ from $\mathcal{F}_{sgx}[\text{prog}_{encl}, \mathcal{R}]$:
        Publish $(pk_{TC}, \sigma_{att})$ Handle(id, params):
    Parse params as $(\_, \_, T)$
    Wait until clock() $\geq T.\text{min}$
    Send (resume, id, params) to $\mathcal{F}_{sgx}[\text{prog}_{encl}, \mathcal{R}]$
    On recv $((\text{id, params, data, } \$g_{dvr}), \sigma)$ from
    $\mathcal{F}_{sgx}[\text{prog}_{encl}, \mathcal{R}]$:
        AuthSend (id, params, data, $\$g_{dvr}$) to $\mathcal{C}_{TC}$ as $\mathcal{W}_{TC}$
        // $msg.m_3$ Main:
    Loop Forever:
        Wait for $\mathcal{C}_{TC}$ to record request (id, params, $\_, \_, \_$):
        Fork a process of Handle(id, params)
    End

*FIG. 8*

```
Program for Town Crier Enclave (prog_encl)

Initialize (void)
    // Subroutine call from F_sgx, which attests to
    // prog_encl and pk_TC. See Figure 3.
    (pk_TC, sk_TC) := Σ.KeyGen(1^λ)
    Output pk_TC Resume(id, params)
    Parse params as (url, spec, T);
    Assert clock() ≥ T.min
    Contact url via HTTPS, obtaining cert
    Verify cert is valid for time clock()
    Obtain webpage w from url
    Assert clock() ≤ T.max
    Parse w to extract data with specification spec
    $g_dvr := $G_max
    σ := Σ.Sign(sk_TC, (id, params, data, $g_dvr))
    Output ((id, params, data, $g_dvr), σ)
```

FIG. 10

CashSettledPut blockchain contract

Constants
$T_{stock}$ := Town Crier stock info request type
$\$F_{TC}$ := fee payed to TC for datagram delivery

Functions

Init: On recv ($C_{TC}$, ticker, $P_S$, $P_U$, $M$, expr, $\$f$) from $\mathcal{W}_{issuer}$
   Assert $\$f = (P_S - P_U) \cdot M + \$F_{TC}$
   Save all inputs and $\mathcal{W}_{issuer}$ to storage.

Buy: On recv ($X$, $\$f$) from $\mathcal{W}_U$:
   Assert isRecovered not set
      and timestamp < expr
      and $\mathcal{W}_{buyer}$ not set
      and $X \leq M$
      and $\$f = (X \cdot P_U)$
   Set $\mathcal{W}_{buyer} = \mathcal{W}_U$
   Save $X$ to storage
   Send $(P_S - P_U)(M - X)$ to $\mathcal{W}_{issuer}$
   // Hold $P_S \cdot X + \$F_{TC}$ Put: On recv () from $\mathcal{W}_{buyer}$:
      and timestamp < expr
      and isPut not set
   Set isPut
   params := $[T_{stock}$, ticker$]$
   callback := this.Settle
   $C_{TC}$.Request(params, callback, $\$F_{TC}$)

Settle: On recv (id, $P$) from $C_{TC}$:
   If $P \geq P_S$
      Send $P_S \cdot X$ to $\mathcal{W}_{issuer}$
      Return
   Send $(P_S - P)X$ to $\mathcal{W}_{buyer}$
   Send all money in contract to $\mathcal{W}_{issuer}$
   Send $P \cdot X$ to $\mathcal{W}_{issuer}$ Recover: On recv () from $\mathcal{W}_{issuer}$:
      and isPut not set
      and isRecovered not set
      and ($\mathcal{W}_{buyer}$ not set
         or timestamp $\geq$ expr)
   Set isRecovered
   Send all money in contract to $\mathcal{W}_{issuer}$

FIG. 11

```solidity
// A simple flight insurance contract using Town Crier's private datagram.
contract FlightIns {
  uint    constant TC_REQ_TYPE = 0;
  uint    constant TC_FEE      = (35000 + 20000) * 5 * 10**10;
  uint    constant FEE         = 10**18;    // $5 in wei
  uint    constant PAYOUT      = 2 * 10**19; // $200 in wei
  uint32  constant MIN_DELAY   = 30;

// The function identifier in Solidity is the first 4 bytes
  // of the sha3 hash of the functions' canonical signature.
  // This contract's callback is bytes4(sha3 ("pay(uint64, bytes32)"))
  bytes4 constant CALLBACK_FID = 0x3d622256;

TownCrier tc;
  address [2**64] requesters;

// Constructor which sets the address of the Town Crier contract.
  function FlightIns(TownCrier _tc) public {
    tc = _tc;
  }

// A user can purchase insurance through this entry point.
  // encFN is an encryption of the flight number and date
  // as well as the time when Town Crier should respond to the request.
  function insure(bytes32 [] encFN) public {
    if (msg.value != FEE) return;

// Adding money to a function call involves calling ".value ()"
    // on the function itself before calling it with arguments.
    uint64 requestId =
      tc.request.value(TC_FEE)(TC_REQ_TYPE, this, CALLBACK_FID, encFN);
    requesters[requestId] = msg.sender;
  }

// This is the entry point for Town Crier to respond to a request.
  function pay (uint64 requestId, bytes32 delay) public {
    // Check that this is a response from Town Crier
    // and that the ID is valid and unfulfilled.
    address requester = requesters [requestId];
    if (msg.sender != address (tc) || requester == 0) return;

if (uint(delay) >= MIN_DELAY) {
      address(requester).send (PAYOUT);
    }
    requesters[requestId] = 0;
  }
}
```

SteamTrade blockchain contract

Constants
$T_{steam}$ := Town Crier Steam trade request type
$\$F_{TC}$ := fee paid to TC for datagram delivery

Functions
  Init: On recv $(C_{TC}, ID_S, encAPI_S, List_I, P)$ from $\mathcal{W}_S$:
    Save all inputs and $\mathcal{W}_S$ to storage.

Buy: On recv $(ID_U, TU, \$f)$ from $\mathcal{W}_U$:
    Assert $\$f = P$
    params := $[encAPI_S, ID_U, T_U, List_I]$
    callback := this.Pay
    id := $C_{TC}$.Request(params, callback, $\$F_{TC}$)
    Store (id, $\mathcal{W}_U$)

Pay: On recv (id, $status$) from $C_{TC}$:
    Retrieve and remove stored (id, $\mathcal{W}_U$)
      // Abort if not found
    If $status > 0$
      Send $\$F_{price}$ to $\mathcal{W}_{seller}$
    Else
      send $\$F_{price}$ to $\mathcal{W}_U$

AUTHENTICATED DATA FEED FOR BLOCKCHAINS

PRIORITY CLAIM

The present application claims priority to U.S. Provisional Patent Application Ser. No. 62/346,604, filed Jun. 7, 2016 and entitled "Authenticated Data Feed for Blockchains," which is incorporated by reference herein in its entirety.

STATEMENT OF GOVERNMENT SUPPORT

This invention was made with government support under Contract Nos. CNS-1314857, CNS-1330599, CNS-1453634, CNS-1518765 and CNS-1514261 awarded by the National Science Foundation. The government has certain rights in the invention.

FIELD

The field relates generally to information security, and more particularly to techniques for providing security for data utilized by blockchains or other types of data consumers.

BACKGROUND

Blockchains are coming into increasingly widespread use in diverse applications involving smart contracts. A fundamental problem in these and other similar blockchain applications is that the smart contracts often require data inputs from various data sources such as external websites. It is difficult in conventional systems to provide adequate authentication of the data inputs from these and other data sources. Similar data authentication issues can arise in non-blockchain data consumption contexts.

SUMMARY

Illustrative embodiments of the invention provide authenticated data feeds for blockchains that support smart contracts.

For example, in one embodiment of this type, an apparatus comprises a processing platform having at least one processing device. The processing platform implements a trusted bridge configured for at least temporary coupling between one or more data sources and a smart contract program of a blockchain. The trusted bridge comprises a secure enclave component and a relay component. Data obtained from a given one of the data sources via the relay component of the trusted bridge is authenticated in the secure enclave component of the trusted bridge. Information based at least in part on the data authenticated in the secure enclave component of the trusted bridge is provided to the smart contract program of the blockchain via the relay component of the trusted bridge. The secure enclave component may be configured to receive a request for authenticated data from the smart contract program of the blockchain via the relay component and to provide a response to the request via the relay component wherein the response is based at least in part on the data authenticated in the secure enclave component.

As a more particular example, one such embodiment comprises a system referred to herein as Town Crier (TC). TC in some implementations acts as a high-trust bridge between existing HTTPS-enabled data websites and an Ethereum blockchain. For example, it can retrieve website data and serve it to relying contracts on the blockchain as concise datagrams. Some implementations of TC utilize Software Guard Extensions (SGX) as a trusted hardware capability, in combination with a smart-contract front end. TC in such an arrangement illustratively executes its core functionality as a trusted piece of code in an SGX enclave, which protects against malicious processes as well as the host operating system, and can attest to a remote client that the client is interacting with a legitimate, SGX-backed instance of the TC code. Numerous other implementations are possible.

Other illustrative embodiments of the invention provide authenticated data feeds for non-blockchain data consumers.

For example, in an embodiment of this type, an apparatus comprises a processing platform having at least one processing device. The processing platform implements a trusted bridge between one or more data sources and a data consuming device. The trusted bridge comprises a secure enclave component and a relay component. The trusted bridge is configured to receive in the secure enclave component a request for authenticated data via the relay component, to receive encrypted credentials in the secure enclave component, to decrypt the encrypted credentials in the secure enclave component, to utilize the decrypted credentials to access a corresponding access-controlled account of a given one of the data sources via the relay component in order to obtain data, and to provide a response to the request via the relay component, the response being based at least in part on the data obtained from the given data source via the relay component. The encrypted credentials may be received in the secure enclave component as part of the request, as part of a previous request, or in other ways. In some implementations of such an embodiment, the credentials comprise user credentials, although other types of credentials can additionally or alternatively be used.

These and other embodiments of the invention include but are not limited to systems, methods, apparatus, processing devices, integrated circuits, and processor-readable storage media having software program code embodied therein.

BRIEF DESCRIPTION OF THE FIGURES

FIGS. 3 and 4 illustrate abstractions for respective portions of the FIG. 2 system.

FIG. 5 shows a process for offline verification of an attestation in the FIG. 2 system.

FIG. 6 shows an example of a TC blockchain contract in the FIG. 2 system.

FIGS. 7 and 8 illustrate respective relay and enclave programs in the FIG. 2 system.

FIGS. 10, 11 and 12 illustrate example applications of the FIG. 9 system in respective financial derivative, flight insurance and gaming marketplace contexts.

DETAILED DESCRIPTION

Embodiments of the invention can be implemented, for example, in the form of information processing systems comprising computer networks or other arrangements of networks, clients, servers, processing devices and other components. Illustrative embodiments of such systems will be described in detail herein. It should be understood, however, that embodiments of the invention are more generally applicable to a wide variety of other types of information processing systems and associated networks, clients, servers, processing devices or other components. Accordingly, the term "information processing system" as used herein is intended to be broadly construed so as to encompass these and other arrangements.

Figure 1:
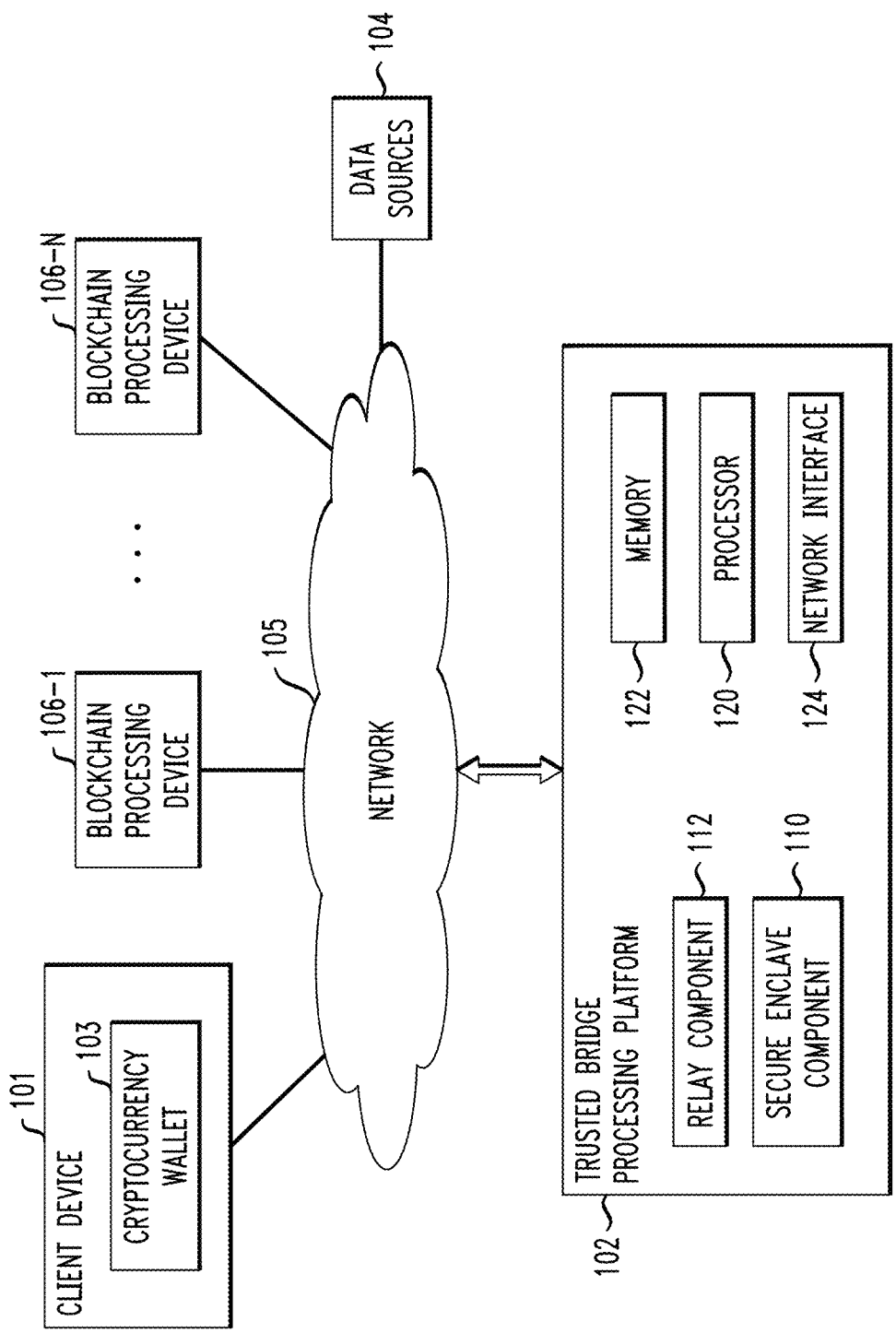
FIG. 1 shows an information processing system implementing an authenticated data feed for a blockchain in an illustrative embodiment.

FIG. 1 shows an information processing system 100 implementing an authenticated data feed for a blockchain in an illustrative embodiment. The system 100 comprises a client device 101 and a trusted bridge processing platform 102. The trusted bridge processing platform 102 is also referred to herein as simply a "trusted bridge." The client device 101 includes a cryptocurrency wallet 103. The system 100 further comprises a plurality of data sources 104 that are configured to communicate with the trusted bridge 102 over a network 105. Also coupled to the network 105 is the client device 101 and a plurality of blockchain processing devices 106-1, . . . 106-N.

The blockchain processing devices 106 collectively implement one or more smart contract programs of a blockchain. Smart contracts are computer programs that autonomously execute the terms of a contract. A given such smart contract program consumes data that is obtained from one or more of the data sources 104 and authenticated by the trusted bridge 102. Smart contracts therefore illustratively include programs that execute autonomously on a blockchain but consume data from sources outside the blockchain. For example, smart contracts can be used to implement a wide variety of different types of financial instruments that consume stock quotes or other types of data from financial data websites.

The system 100 comprising trusted bridge 102 provides an authenticated data feed that supports a broad range of authenticated data requests from one or more smart contracts. For example, the system 100 provides trusted bridge 102 between smart contracts and existing websites, serving source-authenticated data from those websites to relying smart contracts. The system 100 can also be configured to support confidentiality by enabling private data requests with encrypted parameters and secure use of user credentials to scrape access-controlled online data sources.

Although shown in the present embodiment as being entirely separate from the client device 101, the data sources 104 and the blockchain processing devices 106, it is possible in other embodiments for at least portions of the trusted bridge 102 to be implemented at least in part in one or more of such other system elements. These and other alternative trusted bridge configurations can be used in other embodiments.

For example, the trusted bridge 102 can be implemented at least in part in the form of at least one server adapted for at least temporary coupling between a given one of the data sources 104 and the smart contract program of the blockchain. The trusted bridge 102 is configured to communicate with the data sources 104 and the smart contract program of the blockchain via the network 105.

The trusted bridge 102 comprises a secure enclave component 110 and a relay component 112. Data obtained from a given one of the data sources 104 via the relay component 112 of the trusted bridge 102 is authenticated in the secure enclave component 110 of the trusted bridge 102. Information based at least in part on the data authenticated in the secure enclave component 110 of the trusted bridge 102 is provided to the smart contract program of the blockchain, which is implemented at least in part utilizing one or more of the blockchain processing devices 106, via the relay component 112 of the trusted bridge 102.

The information provided to the smart contract program of the blockchain via the relay component 112 of the trusted bridge 102 may comprise, for example, at least a portion of the data authenticated in the secure enclave component 110 of the trusted bridge 102, or data derived from at least a portion of the data authenticated in the secure enclave component 110 of the trusted bridge 102. Accordingly, in some embodiments, all of the data obtained from a given one of the data sources 104 via the relay component 112 and authenticated in the secure enclave component 110 is provided to the smart contract program of the blockchain. Such information is illustratively provided in a response to a request received from the smart contract program.

At least a subset of the data sources 104 illustratively comprise respective HTTPS-enabled websites, although a wide variety of additional or alternative data sources can be used in other embodiments.

The blockchain in some embodiments comprises an Ethereum blockchain collectively maintained by the blockchain processing devices 106, although other types of blockchains can be used in other embodiments. The term "blockchain" as used herein is intended to be broadly construed so as to encompass distributed ledgers and other similar arrangements that are collectively maintained by multiple processing devices performing cryptographic operations involving interrelated data blocks.

Blockchains as used in embodiments herein can therefore include, for example, "permissionless" or public blockchains such as Ethereum and Bitcoin in which any user can participate in building consensus for validation of blockchain transactions, as well as "permissioned" or private blockchains in which only restricted sets of users can participate in building consensus for validation of blockchain transactions.

The smart contract program of the blockchain may include multiple separate programs. For example, in some embodiments, a smart contract program comprises a user contract program and a trusted bridge contract program configured to communicate with the user contract program. The trusted bridge contract program in such an embodiment is further configured to communicate with the secure enclave component 110 of the trusted bridge 102 via the relay component 112 of the trusted bridge 102.

The user contract program and the trusted bridge contract program may be configured to interface with respective user and trusted bridge cryptocurrency wallets in order to support cryptocurrency payment for data authentication services provided by the secure enclave component 110 of the trusted bridge 102. The cryptocurrency wallet 103 of client device 101 is an example of a user cryptocurrency wallet. The trusted bridge cryptocurrency wallet is assumed to be implemented as part of the trusted bridge 102.

The secure enclave component 110 of the trusted bridge 102 in some embodiments comprises an SGX-based secure enclave of at least one processing device of the corresponding processing platform. Other types of secure enclave components can be used in other embodiments. For example, the secure enclave component 110 can be implemented as another type of trusted execution environment, such as an ARM TrustZone trusted execution environment. The term "secure enclave component" as used herein is intended to be broadly construed so as to encompass these and other trusted execution environments.

The term "trusted bridge" as used herein is also intended to be broadly construed, so as to encompass a processing device or set of processing devices that includes one or more trusted execution environments. Such a trusted bridge can include untrusted components in addition to one or more secure enclave components. For example, the relay component 112 in some embodiments is an untrusted component.

The relay component 112 of the trusted bridge 102 in some embodiments comprises multiple interfaces, such as a first interface configured to support communication with a given one of the data sources 104 and a second interface configured to support communication with the smart contract program of the blockchain maintained by the blockchain processing devices 106. The secure enclave component 110 in such an embodiment is configured to authenticate data obtained from the given data source via the first interface of the relay component 112. Information based at least in part on data authenticated in the secure enclave component 110 is provided to the smart contract program of the blockchain via the second interface of the relay component 112. Such information can include the authenticated data itself, or portions thereof, or other data derived therefrom.

The secure enclave component 110 is illustratively configured to receive a request for authenticated data from the smart contract program of the blockchain via the relay component 112 and to provide a response to the request via the relay component 112. The request may be received in the trusted bridge 102 from the client device 101 or another system element, such as one of the blockchain processing devices 106.

The client device 101 is an example of what is also referred to herein as a "remote client device." Such a device is coupled to the trusted bridge 102 over the network 105. The client device 101 can comprise, for example, a laptop computer, tablet computer or desktop personal computer, a mobile telephone, or another type of computer or communication device, as well as combinations of multiple such devices.

The corresponding response to a given request illustratively comprises the data authenticated in the secure enclave component 110, or various portions thereof, or other data derived therefrom. The authenticated data in some embodiments comprises what is referred to herein as a "datagram." For example, the authenticated data from the secure enclave component 110 may be in the form of a datagram X comprising data obtained from a given data source Y for a specified time period T.

At least a portion of a given request for authenticated data from the secure enclave component 110 may be encrypted by the smart contract program using a public key of the secure enclave component 110. A corresponding secret key of the secure enclave component 110 is securely held in trusted hardware of that component.

In some embodiments, the request identifies at least a particular one of the data sources 104 from which data to be authenticated by the secure enclave component 110 is to be obtained via the relay component 112. For example, the request may identify multiple distinct ones of the data sources 104 from which data of a particular type is to be obtained via the relay component 112 for authentication by the secure enclave component 110, with authentication by the secure enclave component 110 being based at least in part on majority voting utilizing the data obtained from the multiple distinct data sources.

Functions other than majority voting may be used in other embodiments. For example, an average, median, minimum, maximum or other type of function of at least portions of the data obtained from the multiple distinct data sources may be used. References herein to majority voting should therefore be understood as illustrative examples only, and a given such reference can be replaced with an average, a minimum, a maximum or another type of function, as well as a combination of multiple functions.

Additionally or alternatively, the request may comprise encrypted user credentials. In such an arrangement, the secure enclave component 110 decrypts the user credentials and utilizes the user credentials to obtain access to a corresponding access-controlled user account of a given one of the data sources 104 in order to obtain the data. The user credentials are illustratively encrypted using a public key of the secure enclave component 110, with the corresponding secret key of the secure enclave component 110 being securely held in trusted hardware of the secure enclave component 110.

In other embodiments, other types of credentials can be used in place of the user credentials mentioned above. For example, such alternative credentials can include application programming interface (API) keys. It is also possible that the credentials could have been provided in a previous request or other communication with the secure enclave component 110. For example, a load request containing the credentials might be followed by a web scraping request for data that is obtainable using the credentials.

The public key of the secure enclave component 110 may be provided to the client device 101 or to other system elements via the relay component as part of an attestation that is generated by the secure enclave component 110.

These and other communications between the various elements of system 100 are assumed to take place over one or more networks collectively represented by network 105 in the figure. The network 105 can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

Although only a single secure enclave component 110 is shown in FIG. 1, the secure enclave component 110 in other embodiments may be one of a plurality of secure enclave components that collectively authenticate data obtained via at least one relay component of at least one trusted bridge. For example, the collective authentication of data by the plurality of secure enclave components may be based at least in part on majority voting of those secure enclave components. Thus, alternative embodiments can implement multiple instances of the secure enclave component 110 and the relay component 112 within the trusted bridge 102 or across multiple instances of the trusted bridge 102. It is also possible for one or both of the secure enclave component 110 and the relay component 112 to each include multiple sets of components or other elements.

The trusted bridge 102 in the present embodiment further comprises a processor 120, a memory 122 and a network interface 124. The processor 120 is assumed to be operatively coupled to the memory 122 and to the network interface 124 although such interconnections are not explicitly shown in the figure.

The processor 120 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination.

The memory 122 stores software program code for execution by the processor 120 in implementing portions of the functionality of the processing device. For example, at least portions of the functionality of secure enclave component 110 and relay component 112 can be implemented using program code stored in memory 122.

A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with one or both of the secure enclave component 110 and the relay component 112 as well as other related functionality.

The network interface 124 is configured to allow the trusted bridge 102 to communicate over the network 105 with other system elements, and may comprise one or more conventional transceivers.

It is be appreciated that the particular arrangement of components and other system elements shown in FIG. 1 is presented by way of illustrative example only, and numerous alternative embodiments are possible. For example, other embodiments of information processing systems configured to provide authenticated data feeds using a trusted bridge will be described herein with reference to FIGS. 2 and 9. These embodiments may be viewed as more detailed examples of possible implementations of system 100 of FIG. 1.

Figure 2A:
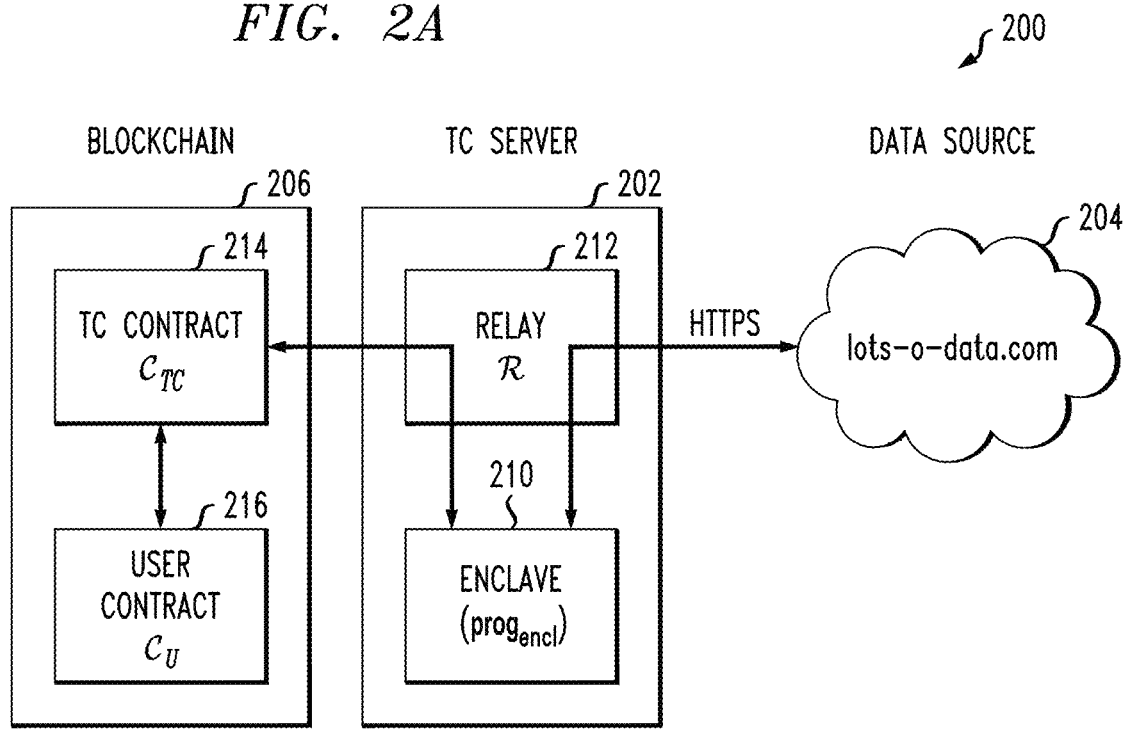
FIGS. 2A, 2B and 2C show different views of another illustrative embodiment of an information processing system implementing an authenticated data feed for blockchain. These figures are also collectively referred to herein as FIG. 2.
Figure 2B:
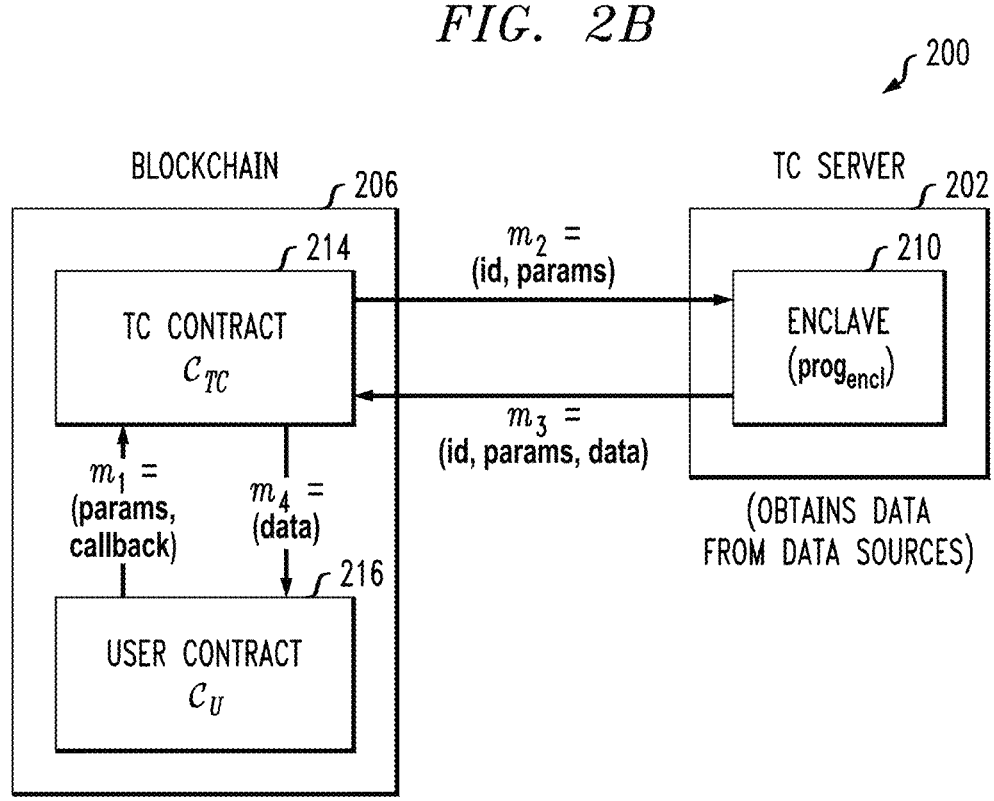
Figure 2C:
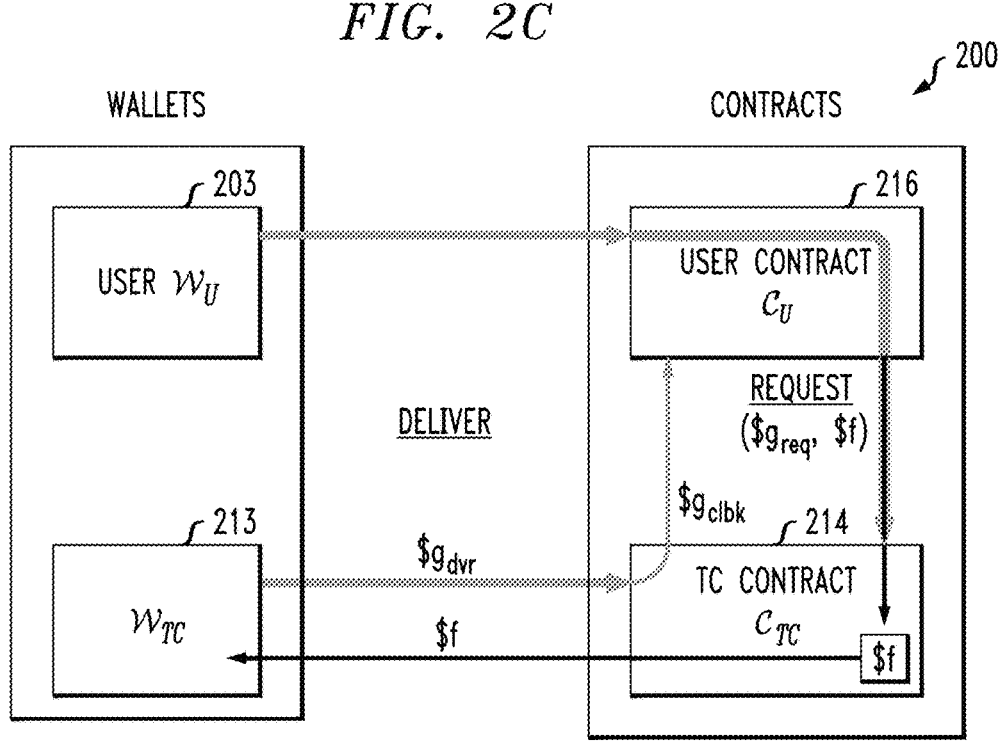

As mentioned previously, FIG. 2 comprises multiple figures denoted FIGS. 2A, 2B and 2C, each showing different aspects of an information processing system 200 comprising a trusted bridge.

The information processing system 200 comprises an embodiment of a trusted bridge also referred to herein as Town Crier (TC). TC illustratively provides an authenticated data feed for smart contracts executing in the context of a blockchain, although it can be adapted in a straightforward manner for use with other types of data consumers, including non-blockchain data consumers.

As shown in FIG. 2A, TC illustratively comprises a TC server 202 arranged between a data source 204 and a blockchain 206. The TC server 202 comprises an enclave 210 and a relay 212. The enclave 210 and relay 212 are examples of what are more generally referred to herein as a "secure enclave component" and a "relay component," respectively. In addition to the TC server 202, TC in this embodiment comprises a TC contract 214 within the blockchain 206. These and other elements of system 200 will be described in more detail below.

TC in some implementations acts as a high-trust bridge between existing HTTPS-enabled websites and an Ethereum blockchain. For example, it can retrieve website data and serve it to relying contracts on the blockchain as concise datagrams. Some implementations of TC utilize an SGX secure enclave as a trusted hardware capability, in combination with a smart-contract front end. The TC in such an arrangement illustratively executes its core functionality as a trusted piece of code in an SGX enclave, which protects against malicious processes as well as the host operating system, and can attest to a remote client that the client is interacting with a legitimate, SGX-backed instance of the TC code. Numerous other implementations are possible.

The smart-contract front end of TC responds to requests by smart contracts on the blockchain with attestations of the following form:

"Datagram X specified by parameters params is served by an HTTPS-enabled website Y during a specified time frame T."

A relying smart contract can verify the correctness of X in such a datagram assuming trust only in the security of SGX, the (published) TC code, and the validity of source data in the specified interval of time.

TC not only provides an authenticated data feed for smart contracts, it also overcomes another critical barrier to smart contract adoption, namely, the lack of confidentiality that would otherwise result from the public visibility of blockchain state and associated public exposure of data requests. TC provides confidentiality by supporting private datagram requests, in which the parameters are encrypted under a public key for ingestion in the SGX enclave of TC and are therefore concealed on the blockchain. TC also supports custom datagram requests, which securely access the online resources of requesters (e.g., online accounts) by ingesting encrypted user credentials, permitting TC to securely retrieve access-controlled data.

TC is configured as a complete, highly scalable, end-to-end system that offers formal security guarantees at the cryptographic protocol level. TC runs on one or more real, SGX-enabled hosts, as opposed to an emulator. By way of example, one possible implementation of TC can be provided as an open-source, production service atop Ethereum, possibly utilizing an Intel Attestation Service (IAS) to verify SGX attestations.

Smart contracts typically execute in an adversarial environment where parties can reap financial gains by subverting the contracts or services on which they rely. Formal security is thus vitally important. We adopt a rigorous approach to the design of TC by modeling it in the UC framework, building on the approaches disclosed in A. Kosba et al., "Hawk: The blockchain model of cryptography and privacy-preserving smart contracts," IEEE Symposium on Security and Privacy, 2016, and Shi et al., "Trusted hardware: Life, the composable universe, and everything," Manuscript, 2015, to achieve an improved formal model that spans a blockchain and trusted hardware. We formally define and show that TC achieves the basic property of datagram authenticity—informally that TC faithfully relays current data from a target website. We additionally show fair expenditure for an honest requester, informally that the fee paid by a user contract calling TC is at most a small amount to cover the operating costs of the TC service, even if the TC host is malicious.

Other features of illustrative embodiments include introducing and showing how to achieve two key security properties: gas sustainability and trusted computing base (TCB) code minimization within a new TCB model created by TC's combination of a blockchain with SGX.

Because of the high resource costs of decentralized code execution and risk of application-layer denial-of-service (DoS) attacks, Ethereum includes an accounting resource called gas to pay for execution costs. Informally, gas sustainability means that an Ethereum service never runs of out of gas, a general and fundamental availability property. We give a formal definition of gas sustainability applicable to any Ethereum service, and illustrate that TC satisfies it.

The combination of blockchains with secure enclaves such as SGX in illustrative embodiments herein provides a powerful and general way to achieve confidentiality in smart contract systems and network them with off-chain systems. This new security paradigm, however, introduces a hybridized TCB that spans components with different trust models. We introduce techniques for using such a hybridized TCB securely while minimizing the TCB code size. In TC, we show how to avoid constructing an authenticated channel from the blockchain to the enclave—bloating the enclave with an Ethereum client—by instead authenticating enclave outputs on the blockchain. We also show how to minimize on-chain signature-verification code. These techniques are general; they apply to any use of a similar hybridized TCB.

Other challenges have been overcome in the design of TC. One is deployment of Transport Layer Security (TLS) in an enclave. Enclaves lack networking capabilities, so TLS code in illustrative embodiments is carefully partitioned between the enclave and untrusted host environment. Another is hedging in TC against the risk of compromise of a website or single SGX instance, which we accomplish in illustrative embodiments with various modes of majority voting: among multiple websites offering the same piece of data (e.g., stock price) or among multiple SGX platforms.

TC embodiments disclosed herein advantageously support deployment of a rich spectrum of smart contracts that would otherwise be difficult to implement in the existing Ethereum ecosystem.

We provide three examples that demonstrate TC's capabilities: (1) A financial derivative (cash-settled put option) that consumes stock ticker data; (2) A flight insurance contract that relies on private data requests about flight cancellations; and (3) A contract for sale of virtual goods and online games (via Steam Marketplace) for Ether, the Ethereum currency, using custom data requests to access user accounts. These three authenticated data feed examples are described in more detail below in conjunction with FIGS. 10, 11 and 12, respectively.

Our experiments with these three applications show that TC is highly scalable. Running on just a single SGX host, TC achieves throughputs of 15-65 tx/sec. TC is easily parallelized across many hosts, as separate TC hosts can serve requests with no interdependency. (For comparison, Ethereum handles less than 1 tx/sec today and it is suggested in K. Croman et al., "On scaling decentralized blockchains (a position paper)," Bitcoin Workshop, 2016, that Bitcoin can scale safely to no more 26 tx/sec with reparametrization.) For these same applications, experimental response times for datagram requests range from 192-1309 ms— much less than an Ethereum block interval (12 seconds on average). These results suggest that a few SGX-enabled hosts can support TC data feed rates well beyond the global transaction rate of a modern decentralized blockchain.

In further description herein, we provide an end-to-end implementation of TC, an authenticated data feed system that addresses critical barriers to the adoption of decentralized smart contracts. TC illustratively combines a smart-contract front end in Ethereum and an SGX-based trusted hardware back end to: (1) Serve authenticated data to smart contracts without a trusted service operator and (2) Support private and custom data requests, enabling encrypted requests and secure use of access-controlled, off-chain data sources. Some implementations of TC may be provided as an open-source service.

Also, we formally analyze the security of TC within the UC framework, defining functionalities to represent both on-chain and off-chain components. We formally define and illustrate the basic properties of datagram authenticity and fair expenditure as well as gas sustainability, a fundamental availability property for any Ethereum service.

In addition, we introduce a hybridized TCB spanning the blockchain and an SGX enclave, a powerful new paradigm of trustworthy system composition. We present generic techniques that help shrink the TCB code size within this model as well as techniques to hedge against individual SGX platform compromises.

Finally, we describe three example TC applications that show TC's ability to support a rich range of services well beyond those in Ethereum today. Experiments with these applications also show that TC can easily meet the latency and throughput requirements of modern decentralized blockchains.

TC utilizes SGX, TLS/HTTPS, and smart contracts, each of which will be described in more detail below.

Intel's SGX comprises a set of new instructions that confer hardware protections on user-level code. See Intel Corporation, "Intel® Software Guard Extensions Programming Reference," 329298-002, US edition, 2014; "Intel® Software Guard Extensions Evaluation SDK User's Guide for Windows OS," 2015; and "Intel® Software Guard Extensions SDK," 2015. See also I. Anati et al., "Innovative technology for CPU based attestation and sealing," Proceedings of the 2nd International Workshop on Hardware and Architectural Support for Security and Privacy, 2013; F. McKeen et al., "Innovative instructions and software model for isolated execution," Proceedings of the 2nd International Workshop on Hardware and Architectural Support for Security and Privacy, 2013; and V. Phegade et al., "Using innovative instructions to create trustworthy software solutions," Proceedings of the 2nd International Workshop on Hardware and Architectural Support for Security and Privacy," ACM Press, New York, New York, USA, 2013. SGX enables process execution in a protected address space known as an enclave. The enclave protects the confidentiality and integrity of the process from certain forms of hardware attack and other software on the same host, including the operating system.

An enclave process cannot make system calls, but can read and write memory outside the enclave region. Thus isolated execution in SGX may be viewed in terms of an ideal model in which a process is guaranteed to execute correctly and with perfect confidentiality, but relies on a (potentially malicious) operating system for network and file-system access. This model is a simplification: SGX is known to expose some internal enclave state to the OS. See, e.g., V. Costan et al., "Intel sgx explained," Cryptology ePrint Archive, Report 2016/086, 2016. Our basic security model for TC assumes ideal isolated execution, but again, TC can also be distributed across multiple SGX instances as a hedge against compromise.

SGX allows a remote system to verify the software in an enclave and communicate securely with it. When an enclave is created, the CPU produces a hash of its initial state known as a measurement. The software in the enclave may, at a later time, request a report which includes a measurement and supplementary data provided by the process, such as a public key. The report is digitally signed using a hardware-protected key to produce a proof that the measured software is running in an SGX-protected enclave. This proof, known as a quote, can be verified by a remote system, while the process-provided public key can be used by the remote system to establish a secure channel with the enclave or verify signed data it emits. We use the generic term "attestation" to refer to a quote, and denote it by att. We assume that a trustworthy measurement of the code for the enclave component of TC is available to any client that wishes to verify an attestation. SGX signs quotes using a group signature scheme called EPID, as described in E. Brickell et al., "Enhanced privacy ID from Bilinear Pairing," IACR Cryptology ePrint Archive, 2009:95, 2009. This choice of primitive is significant in our design of TC, as EPID is a proprietary signature scheme not supported natively in Ethereum. SGX additionally provides a trusted time source via the function sgx_get_trusted_time. On invoking this function, an enclave obtains a measure of time relative to a reference point indexed by a nonce. A reference point remains stable, but SGX does not provide a source of absolute or wall-clock time, another limitation that we work around in TC.

With regard to TLS and HTTPS (HTTP over TLS), these protocols are well understood by those skilled in the art. As we explain later, TC exploits an important feature of HTTPS, namely that it can be partitioned into interoperable layers: an HTTP layer interacting with web servers, a TLS layer handling handshakes and secure communication, and a Transmission Control Protocol (TCP) layer providing reliable data streams.

While TC can in principle support any smart-contract system, we focus in the present embodiment on its use in Ethereum, whose model we now explain. For further details regarding Ethereum, see V. Buterin, "Ethereum: A next-generation smart contract and decentralized application platform," White Paper, 2014, and G. Wood, "Ethereum: A secure decentralised generalised transaction ledger," Ethereum Project Yellow Paper, 2014.

A smart contract in Ethereum is represented as what is called a contract account, comprising code, a currency balance, and persistent memory in the form of a key/value store. A contract accepts messages as inputs to any of a number of designated functions. These entry points, determined by the contract creator, represent an API of the contract. Once created, a contract executes autonomously; it persists indefinitely with even its creator unable to modify its code. There is one exception: a special opcode suicide wipes code from a contract account.

Contract code executes in response to receipt of a message from another contract or a transaction from a non-contract (externally owned) account, informally what we call a wallet. Thus, it is assumed in illustrative embodiments that contract execution is initiated by a transaction. Informally, a contract only executes when "poked," and poking progresses through a sequence of entry points until no further message passing occurs (or a shortfall in gas occurs, as explained below). The "poking" model aside, as a simple abstraction, a smart contract may be viewed as an autonomous agent on the blockchain.

Ethereum has its own associated cryptocurrency called Ether. To prevent DoS attacks, prevent inadvertent infinite looping within contracts, and generally control network resource expenditure, Ethereum allows Ether-based purchase of a resource called gas to power contracts. Every operation, including sending data, executing computation, and storing data, has a fixed gas cost. Transactions include a parameter (GASLIMIT) specifying a bound on the amount of gas expended by the computations they initiate. When a function calls another function, it may optionally specify a lower GASLIMIT for the child call which expends gas from the same pool as the parent. Should a function fail to complete due to a gas shortfall, it is aborted and any state changes induced by the partial computation are rolled back to their pre-call state; previous computations on the call path, though, are retained and gas is still spent.

Along with a GASLIMIT, a transaction specifies a GASPRICE, the maximum amount in Ether that the transaction is willing to pay per unit of gas. The transaction thus succeeds only if the initiating account has a balance of GASLIMIT×GASPRICE Ether and GASPRICE is high enough to be accepted by the system (miner).

As we discuss below, the management of gas is critical to the availability of TC (and other Ethereum-based services) in the face of malicious users.

Finally, we note that transactions in Ethereum are digitally signed for a wallet using ECDSA on the curve Secp256 k1 and the hash function SHA3-256.

Referring once again to FIG. 2A, the general architecture of TC is shown and will now be described in more detail.

As indicated previously, the system 200 includes a trusted bridge comprising TC server 202. The TC server 202 communicates via HTTPS with data source 204 (e.g., a website "lots-o-data.com") over one or more networks that are not explicitly shown. The TC server 202 further communicates with blockchain 206, illustratively maintained by one or more blockchain processing devices that are also not explicitly shown.

The TC server 202 comprises enclave 210 (whose code is denoted by $prog_{encl}$), and relay ($\mathcal{R}$) 212. The enclave 210 and relay 212 are examples of what are more generally referred to herein as "secure enclave" and "relay" components, respectively, of a trusted bridge. The TC system further comprises TC contract ($\mathcal{C}_{TC}$) 214 that resides on the blockchain 206. The enclave 210, relay 212 and TC contract 214 collectively provide an instance of what is referred to herein as a "TC system" or simply TC.

A given smart contract making use of TC is also referred to as a requester or relying contract, which we denote as user contract ($\mathcal{C}_U$) 216, and its (off-chain) owner as a client or user. Data source 204 comprises an online server (e.g., running HTTPS) that provides data which TC draws on to compose datagrams.

In the system 200, data source 204, enclave 210 and TC contract 214 are assumed to be trusted components.

The TC contract $\mathcal{C}_{TC}$ is a smart contract that acts as the blockchain front end for TC. It is designed to present a simple API to user contract $\mathcal{C}_U$ for its requests to TC. $\mathcal{C}_{TC}$ accepts datagram requests from $\mathcal{C}_U$ and returns corresponding datagrams from TC. Additionally, $\mathcal{C}_{TC}$ manages TC's monetary resources.

The enclave 210 in the present embodiment more particularly comprises an SGX enclave running an instance of TC code denoted $prog_{encl}$. The enclave 210 ingests and fulfills datagram requests from the blockchain 206. To obtain the data for inclusion in datagrams, it queries external data sources, such as data source 204, which are assumed to comprise HTTPS-enabled internet services. It returns a datagram to a requesting contract $C_U$ as a digitally signed blockchain message. Under our basic security model for SGX, network functions aside, the enclave 210 runs in complete isolation from an adversarial OS as well as other processes on the corresponding host processing device.

As an SGX enclave process, the enclave 210 lacks direct network access. Thus the relay 212 handles bidirectional network traffic on behalf of the enclave. Specifically, the relay 212 provides network connectivity from the enclave 210 to three different types of entities:

1. The Blockchain (the Ethereum system): The relay 212 scrapes the blockchain 206 in order to monitor the state of the TC contract $C_{TC}$. In this way, it performs implicit message passing from $C_{TC}$ to the Enclave, as neither component itself has network connectivity. Additionally, the relay 212 places messages emitted from the enclave 210 (e.g., datagrams) on the blockchain 206.

2. Clients: The relay 212 runs a web server to handle off-chain service requests from clients—specifically requests for enclave attestations. As we explain below, an attestation provides a unique public key for an instance of the enclave 210 to the client and proves that the enclave is executing correct code in an SGX enclave and that its clock is correct in terms of absolute (e.g., wall-clock) time. A client that successfully verifies an attestation can then safely create a user contract $C_U$ that uses the TC.

3. Data sources: The relay 212 relays traffic between data sources (e.g., HTTPS-enabled websites) and the enclave 210.

The relay 212 is an ordinary user-space application. It does not benefit from integrity protection by SGX and thus, unlike the enclave 210, can be subverted by an adversarial OS on the TC server 202 to cause delays or failures. A key design aim of TC, however, is that relay 212 should be unable to cause incorrect datagrams to be produced or users to lose fees paid to TC for datagrams (although they may lose gas used to fuel their requests). As we will show, in general the relay 212 can only mount DoS attacks against TC.

A brief overview of our security model for TC will now be provided, with additional details to follow later. We assume the following:

The TC contract. $C_{TC}$ is globally visible on the blockchain and its source code is published for clients. Thus we assume that $C_{TC}$ behaves honestly.

Data sources. We assume that clients trust the data sources from which they obtain TC datagrams. We also assume that these sources are stable, i.e., yield consistent datagrams, during a requester's specified time interval T. (Requests are generally time-invariant, e.g., for a stock price at a particular time.)

Enclave security. We make three assumptions: (1) The enclave 210 behaves honestly, i.e., $prog_{encl}$, whose source code is published for clients, correctly executes the protocol; (2) For an enclave-generated keypair $(sk_{TC}, pk_{TC})$, the secret key $sk_{TC}$ is known only to the enclave 210; and (3) The enclave 210 has an accurate (internal) real-time clock. We explain below how we use SGX to achieve these properties.

Blockchain communication. Transaction and message sources are authenticable, i.e., a transaction m sent from wallet $\mathcal{W}_X$ (or message m from contract $C_X$) is identified by the receiving account as originating from X. Transactions and messages are integrity protected (as they are digitally signed by the sender), but not confidential.

Network communication. The relay 212 (and other untrusted components of the TC server) can tamper with or delay communications to and from the enclave 210. (As we explain in our SGX security model, the relay 212 cannot otherwise observe or alter the enclave's behavior.) Thus the relay 212 is subsumed by an adversary that controls the network.

We now outline the protocol of TC at a high level. The basic structure is conceptually simple: a user contract $C_U$ requests a datagram from the TC contract $C_{TC}$, $C_{TC}$ forwards the request to the enclave 210 and then returns the response to $C_U$. There are many details, however, relating to message contents and protection and the need to connect the off-chain parts of TC with the blockchain.

First we give a brief overview of the protocol structure. Then we enumerate the data flows in TC. Finally, we present the framework for modeling SGX as ideal functionalities in accordance with the UC framework.

The lifecycle of a datagram may be briefly summarized in the following steps:

Initiate request. $C_U$ sends a datagram request to $C_{TC}$ on the blockchain.

Monitor and relay. The relay 212 monitors $C_{TC}$ and relays any incoming datagram request with parameters params to the enclave 210.

Securely fetch feed. To process the request specified in params, the enclave 210 contacts the data source 204 via HTTPS and obtains the requested datagram. It forwards the datagram via the relay 212 to $C_{TC}$.

Return datagram. $C_{TC}$ returns the datagram to $C_U$.

FIG. 2B shows a more detailed view of the data flows involved in processing a datagram request in system 200. For simplicity, the figure omits the relay 212, which in the present embodiment is only responsible for data passing.

A datagram request by $C_U$ takes the form of a message $m_1$=(params,callback) to $C_{TC}$ on the blockchain 206. The message component params specifies the requested datagram, e.g., params:=(url,spec,T), where url is the target data source, spec specifies content of the datagram to be retrieved (e.g., a stock ticker at a particular time), and T specifies the delivery time for the datagram (initiated by scraping of the data source). The parameter callback in $m_1$ indicates the entry point to which the datagram is to be returned. While callback need not be in $C_U$, we assume it is for simplicity.

$C_{TC}$ generates a fresh unique id and forwards $m_2$=(id, params) to the enclave 210. In response it receives $m_3$=(id, params,data) from the TC server 202, where data is the datagram (e.g., the desired stock ticker price). $C_{TC}$ checks the consistency of params on the request and response and, if they match, forwards data to the callback entry point in message $m_4$.

For simplicity here, we assume that $C_U$ makes a one-time datagram request. Thus it can trivially match $m_4$ with $m_1$. Our full protocol contains an optimization by which $C_{TC}$ returns id to $C_U$ after $m_1$ as a consistent, trustworthy identifier for all data flows. This enables straightforward handling of multiple datagram requests from the same instance of $C_U$.

Digital signatures are utilized to authenticate messages, such as $m_3$, entering the blockchain from an external source.

We let ($sk_{TC}$, $pk_{TC}$) denote the keypair associated with the enclave 210 for such message authentication. For simplicity, FIG. 2B assumes that the enclave 210 can send signed messages directly to $C_{TC}$. We explain later how TC uses a layer of indirection to send $m_3$ as a transaction via an Ethereum wallet $W_{TC}$.

An Ethereum wallet 213 is shown in FIG. 2C. The set of wallets of system 200 also includes a user wallet 203. The user and Ethereum wallets are also denoted as wallets $W_U$ and $W_{TC}$, respectively. The user wallet 203 interacts with user contract 216 and the Ethereum wallet 213 interacts with TC contract 214. Additional details regarding these interactions will be provided elsewhere herein.

Use of SGX will now be described in more detail. As noted above, $prog_{encl}$ represents the code for enclave 210, which we assume is trusted by all system participants. Illustrative embodiments of TC rely on the ability of SGX to attest to execution of an instance of $prog_{encl}$. To achieve this goal, we first present a model that abstracts away the details of SGX, helping to simplify the protocol presentation and security analysis. We also explain how we use the clock in SGX.

We adopt a formal abstraction of Intel SGX of the type proposed in the above-cited Shi et al. reference. This approach follows the UC and GUC paradigms disclosed in R. Canetti, "Universally composable security: A new paradigm for cryptographic protocols," FOCS, 2001; R. Canetti et al., "Universally composable security with global setup," Theory of Cryptography, pp. 61-85, Springer, 2007; and R. Canetti et al., "Universal composition with joint state," CRYPTO, 2003. Shi et al. propose to abstract away the details of SGX implementation, and instead view SGX as a third party trusted for both confidentiality and integrity. Specifically, we use a global UC functionality $\mathcal{F}_{sgx}(\Sigma_{sgx})$ [$prog_{encl}, \mathcal{R}$] to denote (an instance of) an SGX functionality parameterized by a (group) signature scheme $\Sigma_{sgx}$. Here $prog_{encl}$ denotes the SGX enclave program and $\mathcal{R}$ the physical SGX host (which we assume for simplicity is the same as that of the TC Relay).

Figure 3:
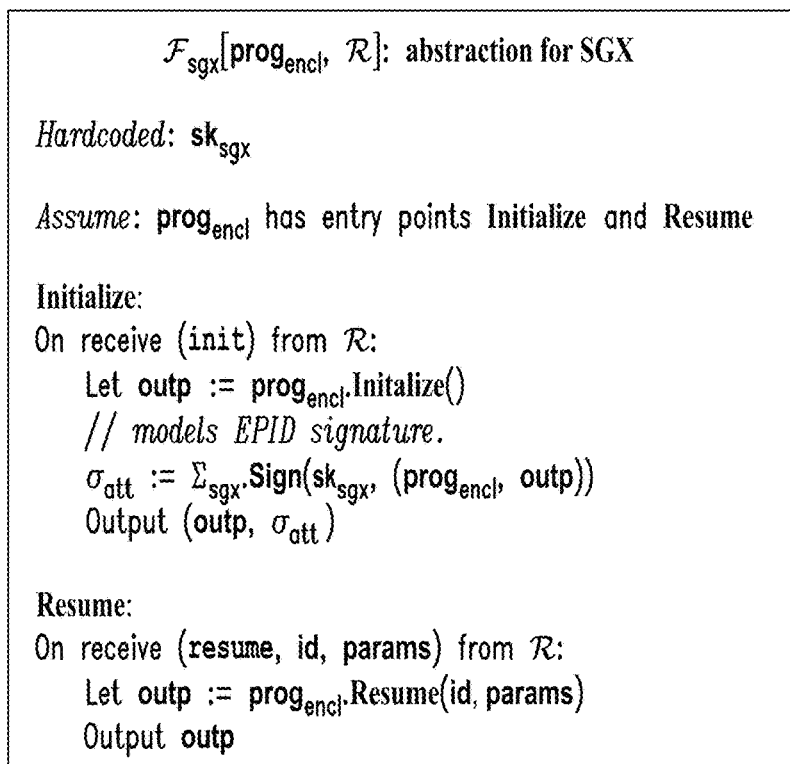

FIG. 3 shows a formal abstraction for SGX execution capturing a subset of SGX features sufficient for implementation of TC. As illustrated in the figure, upon initialization, $\mathcal{F}_{sgx}$ runs outp:=$prog_{encl}$.Initialize( ) and attests to the code of $prog_{encl}$ as well as outp. Upon a resume call with (id,params), $\mathcal{F}_{sgx}$ runs and outputs the result of $prog_{encl}$.Resume(id,params). Further formalism for $\mathcal{F}_{sgx}$ is provided elsewhere herein.

As noted above, the trusted clock for SGX provides only relative time with respect to a reference point. To work around this, the enclave 210 is initialized with the current wall-clock time provided by a trusted source (e.g., the relay 212 under a trust-on-first-use model). In one possible implementation of TC, clients may, in real time, request and verify a fresh timestamp—signed by the enclave 210 under $pk_{TC}$—via a web interface in the relay 212. Thus, a client can determine the absolute clock time of the enclave 210 to within the round-trip time of its attestation request plus the attestation verification time—hundreds of milliseconds in a wide-area network. This high degree of accuracy is potentially useful for some applications but only loose accuracy is required for most.

Ethereum targets a block interval of 12 s and the clock serves in TC primarily to: (1) Schedule connections to data sources and (2) To check TLS certificates for expiration when establishing HTTPS connections. For simplicity, we assume in our protocol specifications that the Enclave clock provides accurate wall-clock time in the canonical format of seconds since the Unix epoch Jan. 1, 1970 00:00 UTC. Note that the trusted clock for SGX, backed by Intel Manageability Engine, is resilient to power outages and reboots. See X. Ruan, "Platform Embedded Security Technology Revealed: Safeguarding the Future of Computing with Intel Embedded Security and Management Engine," Apress, 2014.

We let clock( ) denote measurement of the SGX clock from within the enclave 210, expressed as the current absolute (wall-clock) time.

Before presenting additional TC protocol details, we discuss two key security properties that it provides: gas sustainability and TCB minimization in TC's hybridized TCB model. While we introduce these security properties herein, as we shall explain, they are of broad and general applicability.

The gas sustainability property will initially be described. As explained above, Ethereum's fee model requires that gas costs be paid by the user who initiates a transaction, including all costs resulting from dependent calls. This means that a service that initiates calls to Ethereum contracts must spend money to execute those calls. Without careful design, such services run the risk of malicious users (or protocol bugs) draining financial resources by triggering blockchain calls for which the service's fees will not be reimbursed. This could cause financial depletion and result in an application-layer DoS attack. It is thus critical for the availability of Ethereum-based services that they always be reimbursed for blockchain computation they initiate.

To ensure that a service is not vulnerable to such attacks, we define "gas sustainability," a new condition necessary for the liveness of blockchain contract-based services. Gas sustainability is a basic requirement for any self-perpetuating Ethereum service. It can also generalize beyond Ethereum; any decentralized blockchain-based smart contract system must provide fees of some kind to reimburse miners for performing and verifying computation.

Let bal($W$) denote the balance of an Ethereum wallet $W$.

The property of K-gas sustainability can then be defined as follows. A service with wallet $W$ and blockchain functions $f_1, \ldots, f_n$ is K-gas sustainable if bal($W$)≥K prior to execution of any $f_i$ and the service behaves honestly, then after each execution of an $f_i$ initiated by $W$, bal($W$)≥K.

Recall that a call made in Ethereum with insufficient gas will abort, but spend all provided gas. While Ethereum trivially guarantees 0-gas sustainability, if a transaction is submitted by a wallet with insufficient funds, the wallet's balance will drop to 0. Therefore, to be K-gas sustainable for K>0, each blockchain call made by the service must reimburse gas expenditures. Moreover, the service must have sufficient gas for each call or such reimbursement will be reverted with the rest of the transaction. TC in illustrative embodiments achieves the property of gas sustainability for K>0.

We will now describe TCB minimization in TC's hybridized TCB model with reference to FIG. 4.

In a system involving a smart contract interacting with an off-chain trusted computing environment (e.g., SGX), the TCB is a hybrid of two components with distinct properties. Computation in the smart contract is slow, costly, and completely transparent, meaning it cannot rely on secrets. An SGX enclave is computationally powerful and executes privately, but all external interaction—notably including communication with the contract—goes through an untrusted intermediary in illustrative embodiments. While this hybrid TCB is powerful and useful well beyond TC, it presents a challenge: establishing secure communication between the components while minimizing the code in the TCB.

FIG. 4 illustrates abstractions for both off-chain and on-chain TCB components. To distinguish these abstractions from formal ideal functionalities, we use $\mathcal{T}$ (for trusted component), rather than $\mathcal{F}$. We model the authentication of on-chain messages by an oracle $\mathcal{O}_{Auth}$, which returns true if an input is a valid blockchain transaction. Since Ethereum blocks are self-authenticated using Merkle trees, in principle we can realize $\mathcal{O}_{Auth}$ by including an Ethereum client in the TCB. Doing so drastically increases the code footprint, however, as the core Ethereum implementation is about 50 k lines of C++. Similarly, a smart contract could authenticate messages from an SGX by checking attestations, but implementing this verification in a smart contract would be error-prone and computationally (and thus financially) expensive.

Instead we provide two general techniques to avoid these costly calls (highlighted by dashed boxes in FIG. 4) and thereby minimize code size in the TCB. The first applies to any hybrid system where one TCB component is a blockchain contract. The second applies to any hybrid system where the TCB components communicate only to make and respond to requests.

The first general technique involves binding $\mathcal{T}_{Off}$ to $\mathcal{W}_{TC}$. Due to the speed and cost of computation in the on-chain TCB, we wish to avoid implementing signature verification (e.g., Intel's EPID). There does exist a precompiled Ethereum contract to verify ECDSA signatures, but the operation requires a high gas cost. Instead, we describe here how to bind the identity of $\mathcal{T}_{Off}$ to an Ethereum wallet, which allows $\mathcal{T}_{On}$ to simply check the message sender, which is already verified as part of Ethereum's transaction protocol.

A key observation is that information can only be inserted into the Ethereum blockchain as a transaction from a wallet. Thus, the only way the Relay can relay messages from $\mathcal{T}_{Off}$ to $\mathcal{T}_{On}$ is through a wallet $\mathcal{W}_{TC}$. Since Ethereum itself already verifies signatures on transactions (i.e., users interact with Ethereum through an authenticated channel), we can piggyback verification of $\mathcal{T}_{Off}$ signatures on top of the existing transaction signature verification mechanism. Simply put, the $\mathcal{T}_{Off}$ creates $\mathcal{W}_{TC}$ with a fresh public key $pk_{Off}$ whose secret is known only to $\mathcal{T}_{Off}$.

To make this idea work fully, the public key $pk_{Off}$ is hardcoded into $\mathcal{T}_{On}$. A client creating or relying on a contract that uses $\mathcal{T}_{On}$ is responsible for ensuring that this hardcoded $pk_{Off}$ has an appropriate SGX attestation before interacting with $\mathcal{T}_{On}$.

FIG. 5 shows the protocol for a client to check that $\mathcal{T}_{On}$ is backed by a valid $\mathcal{T}_{Off}$ instance. We let Verify denote a verification algorithm for EPID signatures. In the protocol shown, a client checks an SGX attestation of the enclave's code $\mathcal{T}_{Off}$ and public key $pk_{Off}$. The client also checks that $pk_{Off}$ is hardcoded into blockchain contract $\mathcal{T}_{On}$ before using $\mathcal{T}_{On}$. We omit the modeling here of IAS online revocation checks.

In summary, by assuming that relying clients have verified an attestation of $\mathcal{T}_{Off}$, we can assume that datagrams sent from $\mathcal{W}_{TC}$ are trusted to originate from $\mathcal{T}_{Off}$. This eliminates the need to do costly EPID signature verification in $\mathcal{T}_{On}$.

Additionally, SGX can seal $pk_{Off}$ in non-volatile storage while protecting integrity and confidentiality, allowing us to maintain the same binding through server restarts.

The second general technique involves eliminating $\mathcal{O}_{Auth}$. To eliminate the need to call $\mathcal{O}_{Auth}$ from $\mathcal{T}_{Off}$, we leverage the fact that all messages from $\mathcal{T}_{Off}$ to $\mathcal{T}_{On}$ are responses to existing requests. Instead of verifying request parameters in $\mathcal{T}_{Off}$, we can verify in $\mathcal{T}_{On}$ that $\mathcal{T}_{Off}$ responded to the correct request. For each request, $\mathcal{T}_{On}$ stores the parameters of that request. In each response, $\mathcal{T}_{Off}$ includes the parameters it used to fulfill the request. $\mathcal{T}_{On}$ can then check that the parameters in a response match the stored parameters and, if not, simply reject. Storing parameters and checking equality are simple operations, so the above-described approach is vastly simpler than calling $\mathcal{O}_{Auth}$ inside $\mathcal{T}_{Off}$.

This approach may appear to open new attacks (e.g., the relay 212 can send bogus requests to which the $\mathcal{T}_{Off}$ respond). As we show below, however, all such attacks reduce to DoS attacks from the network or the relay—attacks to which hybrid TCB systems are inherently susceptible and which we do not aim to protect against in TC.

We now present some preliminaries followed by a more detailed description of the TC protocol. For simplicity, we assume a single instance of $prog_{encl}$, although the architecture can readily scale up to multiple enclaves and even multiple hosts.

To ensure gas sustainability, requesters make gas payments up front as Ether. $\mathcal{C}_{TC}$ then reimburses the gas costs of TC. By having a trusted component perform the reimbursement, we are also able to guarantee that a malicious TC cannot steal an honest user's money without delivering valid data.

We use msg.$m_i$ to label messages corresponding to those in FIG. 2B. For payment, let $g denote gas and $f to denote non-gas currency. In both cases $ is a type annotation and the letter denotes the numerical amount. For simplicity, we assume that gas and currency adopt the same units (allowing us to avoid explicit conversions). We use the identifiers in Table 1 to denote currency and gas amounts.

TABLE 1

Identifiers for Currency and Gas Amounts

| | |
|---|---|
| $f | Currency a requester deposits to refund Town Crier's gas expenditure to deliver a datagram |
| $g_{req} | GASLIMIT when invoking Request, Deliver, or |
| $g_{dvr} | Cancel, respectively |
| $g_{encl} | |
| $g_{clbk} | GASLIMIT for callback while executing Deliver, set to the max value that can be reimbursed |
| $G_{min} | Gas required for Deliver excluding callback |
| $G_{max} | Maximum gas TC can provide to invoke Deliver |
| $G_{encl} | Gas needed to invoke Cancel |
| $G_{ø} | Gas needed for Deliver on a canceled request |

In accordance with this notation, $G_{min}$, $G_{max}$, $G_{encl}$, and $G_{ø}$ are system constants, $f is chosen by the requester (and may be malicious if the requester is dishonest), and $g_{dvr}$ is chosen by the enclave 210 when calling Deliver. Though $g_{req}$ and $g_{encl}$ are set by the requester, a user-initiated transaction will abort if they are too small, so we need not worry about the values.

Upon initialization of the TC protocol, TC deposits at least $G_{max}$ into the wallet $\mathcal{W}_{TC}$.

The TC contract accepts a datagram request with fee $f from the user contract $\mathcal{C}_U$, assigns it a unique id, and records it. The relay 212 monitors requests and forwards them to the enclave 210. As described previously, upon receipt of a response from the wallet $\mathcal{W}_{TC}$, $\mathcal{C}_{TC}$ verifies that params'=params to ensure validity. If the request is valid, $\mathcal{C}_{TC}$ forwards the resulting datagram data by calling the callback specified in the initial request. To ensure that all gas spent can be reimbursed, $C_{TC}$ sets $\$g_{clbk}:=\$f-\$G_{min}$ for this sub-call.

FIG. 6 shows an example program for the TC contract $C_{TC}$ reflecting fees. Here, Call denotes a call to a contact entry point. The last argument of each function is the GASLIMIT provided.

As noted previously, the relay 212 bridges the gap between the enclave 210 and the blockchain 206 in the following ways.

1. It scrapes the blockchain 206 and monitors $C_{TC}$ for new requests (id,params).
2. It boots the enclave 210 with $prog_{encl}$.Initialize( ) and calls $prog_{encl}$.Resume(id,params) on incoming requests.
3. It forwards datagrams from the enclave 210 to the blockchain 206.

Recall that it forwards already-signed transactions to the blockchain 206 as $W_{TC}$.

FIG. 7 shows an example program for the relay 212, also referred to herein as relay $\mathcal{R}$. The function AuthSend inserts a transaction to blockchain ("as $W_{TC}$" means the transaction is already signed with $sk_{TC}$). An honest relay 212 will invoke $prog_{encl}$.Resume exactly once with the parameters of each valid request and never otherwise.

When initialized through Initialize( ), $prog_{encl}$ of enclave 210 ingests the current wall-clock time; by storing this time and setting a clock reference point, it calibrates its absolute clock. It generates an ECDSA keypair ($pk_{TC}$, $sk_{TC}$) (parameterized as in Ethereum), where $pk_{TC}$ is bound to the $prog_{encl}$ instance through insertion into attestations.

Upon a call to Resume(id,params), $prog_{encl}$ contacts the data source specified by params via HTTPS and checks that the corresponding certificate cert is valid. Certificate checking is discussed in more detail elsewhere herein. Then $prog_{encl}$ fetches the requested datagram and returns it to the relay 212 along with params, id, and a GASLIMIT $\$g_{dvr}$:=$\$G_{max}$, all digitally signed with $sk_{TC}$.

FIG. 8 shows an example of $prog_{encl}$ implementing the enclave 210.

The user contract $C_U$ is implemented in the following manner. An honest requester first follows the protocol in FIG. 5 to verify the SGX attestation. Then the requester prepares params and callback, sets $\$g_{req}$ to the cost of Request with params, sets $\$f$ to $\$G_{min}$ plus the cost of executing callback, and invokes Request(params,callback, $\$f$) with GASLIMIT $\$g_{req}$.

If callback is not executed, the requester can invoke Cancel(id) with GASLIMIT $\$G_{encl}$ to receive a partial refund. An honest requester will invoke Cancel at most once for each of its requests and never for any other user's request.

The money flow for a delivered request is shown in FIG. 2C. Darker shaded arrows denote flow of money and lighter shaded arrows denote gas limits. The thickness of the lines indicate the quantity of resources. For example, the $\$g_{clbk}$ arrow is thin because $\$g_{clbk}$ is limited to $\$f-\$G_{min}$.

In addition to ordinary datagrams, TC supports private datagrams, which are requests where params includes ciphertexts under $pk_{TC}$. Private datagrams can thus enable confidentiality-preserving applications despite the public readability of the blockchain. Custom datagrams, also supported by TC, allow a contract to specify a particular web-scraping target, potentially involving multiple interactions, and thus greatly expand the range of possible relying contracts for TC. We give examples of both datagram types below.

Our basic security model for TC assumes the ideal isolation model for SGX described above as well as client trust in data sources. Given various concerns about SGX security described in the above-cited V. Costan et al. reference and in Y. Xu et al., "Controlled-channel attacks: Deterministic side channels for untrusted operating systems," IEEE Symposium on Security and Privacy 2015, pp. 640-656, May 2015, and the possible fallibility of data sources, we examine two important ways TC can support hedging. To protect against the compromise of a single SGX instance, contracts may request datagrams from multiple SGX instances and implement majority voting among the responses. This hedge requires increased gas expenditure for additional requests and storage of returned data. Similarly, TC can hedge against the compromise of a data source by scraping multiple sources for the same data and selecting the majority response. We demonstrate both of these mechanisms in our example financial derivative application, and also disclose a potential optimization.

Security analysis of the TC protocol will now be described in greater detail. More particularly, it can be shown that the TC protocol provides authenticity and fee safety.

Authenticity generally means that an adversary (including a corrupt user, Relay, or collusion thereof) cannot convince $C_{TC}$ to accept a datagram that differs from the expected content obtained by crawling the specified url at the specified time. In our formal definition, we assume that the user and $C_{TC}$ behave honestly. Recall that the user in illustrative embodiments verifies upfront the attestation $\sigma_{att}$ that vouches for the enclave's public key $pk_{TC}$.

In some embodiments, the TC protocol can be said to provide authenticity of data feed if, for any polynomial-time adversary $\mathcal{A}$ that can interact arbitrarily with $\mathcal{F}_{sgx}$, $\mathcal{A}$ cannot cause an honest verifier to accept ($pk_{TC}$,$\sigma_{att}$,params:= (url,$pk_{url}$,T),data,$\sigma$) where data is not the contents of url with the public key $pk_{url}$ at time T ($prog_{encl}$.Resume(id, params) in our model). More formally, for any probabilistic polynomial-time adversary $\mathcal{A}$, $$Pr\begin{bmatrix}(pk_{TC}, \sigma_{att}, id, \text{params}, \text{data}, \sigma) \leftarrow \mathcal{A}^{\mathcal{F}_{sgx}}(1^\lambda): \\ \left(\sum_{sgx} \cdot \text{Verify}(pk_{sgx}, \sigma_{att}, (prog_{encl}, pk_{TC})) = 1\right) \wedge \\ (\Sigma \cdot \text{Verify}(pk_{TC}, id, \text{params}, \text{data}) = 1) \wedge \\ Pr[\text{data} \neq prog_{encl} \cdot \text{Resume}(id, \text{params})]\end{bmatrix} \leq negl(\lambda),$$

for security parameter $\lambda$.

Assuming that $\Sigma_{sgx}$ and $\Sigma$ are secure signature schemes, the TC protocol achieves authenticity of data feed in accordance with the foregoing definition. It is to be appreciated that other definitions of data feed authenticity can be used in other embodiments.

Recall that we model SGX's group signature as a regular signature scheme under a manufacturer public key $pk_{sgx}$ using the model of Shi et al.

With regard to fee safety, the TC protocol ensures that an honest TC will not run out of money and that an honest requester will not pay excessive fees.

More particularly, it can be shown that TC is $\$G_{max}$-gas sustainable.

An honest user should only have to pay for computation that is executed honestly on behalf of that user. If a valid datagram is delivered, this is a constant value plus the cost of executing callback. Otherwise the requester should be able to recover the cost of executing Deliver. For the above-noted gas sustainability property to hold, $C_{TC}$ retains a small fee on cancellation, but we allow the user to recover all but this small constant amount. More formally, for any params and callback, let $\$G_{req}$ and $\$F$ be the honestly-chosen values of $\$g_{req}$ and $\$f$, respectively, when submitting the request (params,callback,$\$f,\$g_{req}$). For any such request submitted by an honest user, one of the following holds:
   callback is invoked with a valid datagram matching the request parameters params, and the requester spends at most $\$G_{req}+\$G_{encl}+\$F$;
   The requester spends at most $\$G_{req}+\$G_{encl}+\$G_0$.

Concerns about attacks outside the SGX isolation model embraced in the basic TC protocol were addressed above. A threat we do not address in TC is the risk of traffic analysis by a network adversary or compromised Relay against confidential applications (e.g., with private datagrams), although we briefly discuss the issue below. We also note that while TC assumes the correctness of data sources, if a scraping failure occurs, TC delivers an empty datagram, enabling relying contracts to fail gracefully.

Additional implementation details and other practical considerations regarding TC embodiments will be described below with reference to FIGS. 9 through 12. Again, it is to be appreciated that these details are illustrative rather than limiting. Numerous other implementations are possible that do not utilize the particular details presented below.

Figure 9:
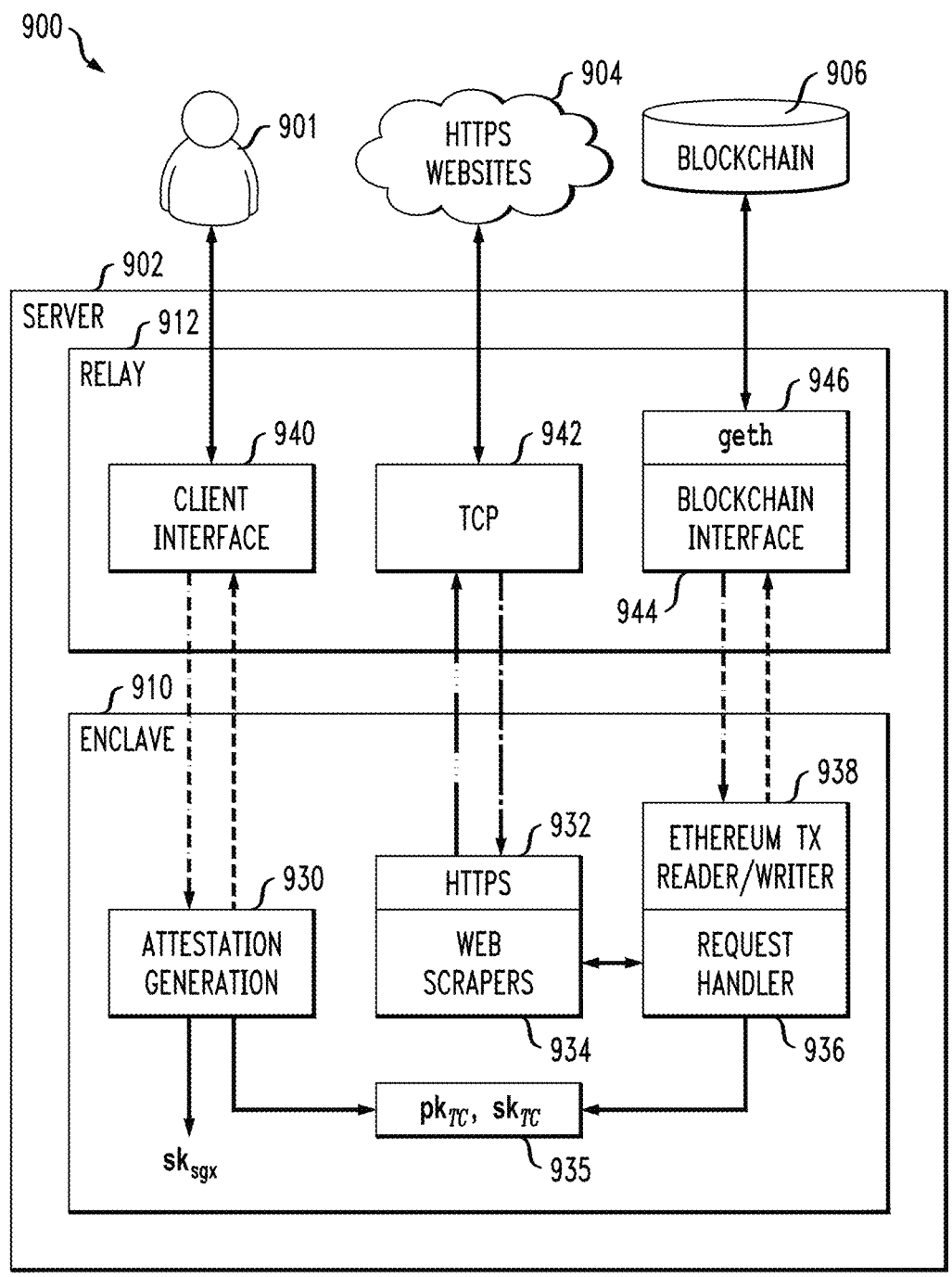
FIG. 9 shows a further illustrative embodiment of an information processing system implementing an authenticated data feed for blockchain.

Referring now to FIG. 9, an information processing system 900 in an illustrative embodiment is configured for utilization by a user 901. The user 901 illustratively represents a remote client device of the system 900. The system 900 comprises a TC server 902 arranged between HTTPS websites 904 and a blockchain 906. The TC server 902 includes an enclave 910 and a relay 912, both of which generally operate in the manner described in conjunction with the TC embodiments previously described.

For example, the relay 912 may be configured as previously described in conjunction with FIG. 7. The relay 912 comprises untrusted code of the TC server 902, and provides essentially only network functionality. Similarly, the enclave 910 may be configured as previously described in conjunction with FIG. 8.

Although not explicitly shown in FIG. 9, a TC contract $\mathcal{C}_{TC}$ of the type previously described in conjunction with FIG. 6 is implemented using one or more blockchain processing devices of the blockchain 906. The TC contract $\mathcal{C}_{TC}$ is assumed to be implemented in Solidity, a high-level language with JavaScript-like syntax which compiles to Ethereum Virtual Machine bytecode—the language Ethereum contracts use. In order to handle a variety of different types of requests—including encrypted parameters—the $\mathcal{C}_{TC}$ implementation illustratively utilizes two parameter fields: an integer specifying the type of request (e.g., flight status) and a byte array of user-specified size. This byte array is parsed and interpreted inside the enclave 910, but is treated as an opaque byte array by $\mathcal{C}_{TC}$. For convenience, we include the timestamp of the current block as an implicit parameter.

To guard against the relay 912 tampering with request parameters, the $\mathcal{C}_{TC}$ includes params as an argument to Deliver which validates against stored values. To reduce this cost for large arrays, we store and verify SHA3-256(request-Type∥timestamp∥paramArray). The relay 912 scrapes the raw values for the Enclave which computes the hash and includes it as an argument to Deliver.

As mentioned previously, to allow for improved efficiency in client contracts, Request returns id and Deliver includes id along with data as arguments to callback. This allows client contracts to make multiple requests in parallel and differentiate the responses, so it is no longer necessary to create a unique client contract for every request to $\mathcal{C}_{TC}$.

The TC server 902 is implemented as an SGX-enabled application in C++, using the Intel SGX Software Development Toolkit (SDK). In the programming model supported by the SGX SDK, the body of an SGX-enabled application runs as an ordinary user-space application, while a relatively small piece of security-sensitive code runs in the isolated environment of the SGX enclave.

The enclave portion of an SGX-enabled application may be viewed as a shared library exposing an API in the form of ecalls to be invoked by the untrusted application. Invocation of an ecall transfers control to the enclave 910; the enclave code runs until it either terminates and explicitly releases control, or some special event (e.g., exception) happens. Again, as we assume SGX provides ideal isolation, the untrusted application cannot observe or alter the execution of ecalls.

Enclave programs can make "ocalls" to invoke functions defined outside of the enclave. An ocall triggers an exit from the enclave; control is returned once the ocall completes. As ocalls execute outside the enclave, they are treated by enclave code as untrusted.

Additional details regarding the enclave 910 and relay 912 of the TC server 902 will now be described.

The enclave 910 in this embodiment comprises an attestation generator 930, an HTTPS service 932, web scrapers 934, keypair 935, request handler 936 and Ethereum transaction (TX) reader/writer 938. The HTTPS service 932 and web scrapers interact with HTTPS websites 904 and the request handler 936 and its associated Ethereum TX reader/writer 938 process datagram requests from the blockchain 906.

The relay 912 in this embodiment comprises a client interface 940, a TCP interface 942, and a blockchain interface 944 having an associated Geth program 946. The client interface 940 serves attestations and timestamps.

The enclave 910 does not have direct access to host network functionality. TC thus partitions HTTPS into a trusted layer, comprising HTTP and TLS code implemented in HTTPS service 932 of the enclave 910, and an untrusted layer that provides low-layer network service, specifically TCP interface 942 of relay 912. This arrangement allows the enclave 910 to establish a secure channel with a web server; the enclave 910 itself performs the TLS handshake with a target server and performs all cryptographic operations internally, while the untrusted process acts as a network interface only.

In implementing the FIG. 9 embodiment, we ported a TLS library (mbedTLS of ARM Limited) and HTTP code into the SGX environment. We minimized the HTTP code to provide the web-scraping functionality of TC while keeping the TCB small. To verify certificates presented by remote servers, we hardcoded a collection of root certificate authority (CA) certificates into the enclave code; in one possible version of TC, the root CAs are identical to those in a Chrome web browser. By using its internal, trusted wall-clock time, it is possible to verify that a certificate has not expired.

The web scrapers 934 were implemented for the particular example applications to be described below, but more general approaches can be used in other embodiments.

The request handler 936 in the present embodiment performs the following operations:
 1. It ingests a datagram request in Ethereum's serialization format, parses it, and decrypts it (if it is a private-datagram request).

2. It generates an Ethereum transaction containing the requested datagram (and parameter hash), serializes it as a blockchain transaction, signs it using $sk_{TC}$, and furnishes it to the relay 912.

We implemented the Ethereum ABI and RLP which, respectively, specify the serialization of arguments and transactions in Ethereum.

As noted above, an attestation in some embodiments comprises a report digitally signed by the Intel-provided Quoting Enclave (QE). Therefore two phases are involved in generating att. First, the enclave 910 calls sgx_create_report to generate a report with QE as the target enclave. Then the relay 912 forwards the report to QE and calls sgx_get_quote to get a signed version of the report, namely an attestation.

As indicated previously, a client starts using TC by requesting and verifying an attestation att and checking the correctness of the clock in the enclave 910 using a fresh timestamp. The client interface 940 caches att upon initialization of $prog_{encl}$. When it receives a web request from a client for an attestation, it issues an ecall to the enclave 910 to obtain a Unix timestamp signed using $sk_{TC}$, which it returns to the client along with att. The client verifies att using IAS and then verifies the timestamp using $pk_{TC}$ and checks it using any trustworthy time service.

The enclave 910 relies on the relay 912 to access networking and wall-clock time (used for initialization) provided by the OS and implemented as ocalls.

The blockchain interface 944 of the relay 912 monitors the blockchain 906 for incoming requests and places transactions on the blockchain 906 in order to deliver datagrams. The blockchain interface 944 has an associated official Ethereum client in the form of Geth program 946. Although shown as a separate component, the Geth program can be incorporated within the blockchain interface 944 in other embodiments. The Geth program is illustratively configured in the form of a JavaScript Object Notation (JSON) Remote Procedure Call (RPC) server. The relay 912 communicates with the blockchain 906 indirectly via RPC calls to this JSON RPC server. For example, to insert a signed transaction, the relay 912 simply calls eth_sendRawTransaction with the byte array of the serialized transaction. We emphasize that, as the enclave 910 holds the secret key $sk_{TC}$, transactions are signed within the enclave 910.

As mentioned above, we adopt the UC model of SGX proposed by Shi et al. In particular, their abstraction captures a subset of the features of Intel SGX. The main idea behind the UC modeling by Shi et al. is to think of SGX as a trusted third party defined by a global functionality $\mathcal{F}_{sgx}$ as previously described in conjunction with FIG. 3.

For simplicity, the $\mathcal{F}_{sgx}$ model in the present embodiment does not capture the issue of revocation. In this case, as Shi et al. point out, we can model SGX's group signature simply as a regular signature scheme $\Sigma_{sgx}$, whose public and secret keys are called "manufacturer keys" and denoted $pk_{sgx}$ and $sk_{sgx}$ (i.e., think of always signing with the 0-th key of the group signature scheme). We adopt this notational choice from Shi et al. for simplicity. In order to take revocation into account, it is always possible to replace this signature scheme with a group signature scheme in the modeling.

The $\mathcal{F}_{sgx}(\Sigma_{sgx})$ functionality described by Shi et al. is a global functionality shared by all protocols, parametrized by a signature scheme $\Sigma_{sgx}$. This global $\mathcal{F}_{sgx}$ is meant to capture all SGX machines available in the world, and keeps track of multiple execution contexts for multiple enclave programs, happening on different SGX machines in the world. For convenience, the present embodiment adopts the notation $\mathcal{F}_{sgx}(\Sigma_{sgx})[prog_{encl}, \mathcal{R}]$ to denote one specific execution context of the global $\mathcal{F}_{sgx}$ functionality where the enclave program in question is $prog_{encl}$, and the specific SGX instance is attached to a physical machine $\mathcal{R}$. As the relay in TC comprises all functionality outside the enclave, we use $\mathcal{R}$ for convenience also to denote the physical host. This specific context $\mathcal{F}_{sgx}(\Sigma_{sgx})[prog_{encl}, \mathcal{R}]$ ignores all parties' inputs except those coming from $\mathcal{R}$. We often omit writing $\Sigma_{sgx}$ without risk of ambiguity.

The $\mathcal{F}_{sgx}$ model described above captures the following operations:

Initialize. Initialization is run only once. Upon receiving init, $\mathcal{F}_{sgx}$ runs the initialization part of the enclave program denoted outp:=$prog_{encl}$.Initialize( ). Then, $\mathcal{F}_{sgx}$ attests to the code of the enclave program $prog_{encl}$ as well as outp. The resulting attestation is denoted $\sigma_{att}$.

Resume. When resume is received, $\mathcal{F}_{sgx}$ calls $prog_{encl}$.Resume on the input parameters denoted params. $\mathcal{F}_{sgx}$ outputs whatever $prog_{encl}$.Resume outputs. $\mathcal{F}_{sgx}$ is stateful, i.e., allowed to carry state between init and multiple resume invocations.

Finally, we note that this formal model by Shi et al. is speculative, since we know of no formal proof that Intel's SGX does securely realize this abstraction (or realize any useful formal abstraction at all for that matter)—in fact, available public documentation of SGX does not provide sufficient information for making such formal proofs. As such, the formal model of Shi et al. appears to be the best available tool for us to formally reason about security for SGX-based protocols. Shi et al. leave it as an open question to design secure processors with clear formal specifications, such that they can be used in the design of larger protocols/systems supporting formal reasoning of security. See the above-cited Shi et al. reference for a more detailed description of the UC modeling of Intel SGX.

Our protocol notation in some embodiments adopts the formal blockchain framework recently proposed in the above-cited Kosba et al. reference. In addition to UC modeling of blockchain-based protocols, Kosba et al. also design a modular notational system that is intuitive and factors out tedious but common features inside functionality and protocol wrappers (e.g., modeling of time, pseudonyms, adversarial reordering of messages, a global ledger). The advantages of adopting Kosba et al.'s notational system are that these: the blockchain contracts and user-side protocols are intuitive on their own and they are endowed with precise, formal meaning when we apply the blockchain wrappers.

While Kosba et al.'s formal blockchain model is applicable for the most part, we point out a subtle mismatch between their formal blockchain model and the real-world instantiation of blockchains such as Ethereum and Bitcoin. The design of TC is secure in a slightly modified version of the blockchain model that more accurately reflects the real-world Ethereum instantiation of a blockchain.

As suggested by the above-described gas sustainability property, we carefully handle the case of Deliver arriving after Cancel. In the formal blockchain model proposed by Kosba et al., we can easily address this issue by introducing a timeout parameter $T_{timeout}$ that the requester attaches to each datagram request. If the datagram fails to arrive before $T_{timeout}$, the requester can call Cancel any time after $T_{timeout}+\Delta T$. On the surface, this seems to ensure that no Deliver will be invoked after Cancel assuming TC is honest.

However, we do not adopt this approach due to a technical subtlety that arises in this context—again, the fact that the Ethereum blockchain does not perfectly match the formal blockchain model specified by Kosba et al. Specifically, the blockchain model by Kosba et al. assumes that every message (e.g., transaction) will be delivered to the blockchain by the end of each epoch and that the adversary cannot drop any message. In practice, however, Ethereum adopts a dictatorship strategy in the mining protocol, and the winning miner for an epoch can censor transactions for this specific epoch, and thus effectively this transaction will be deferred to later epochs. Further, in case there are more incoming transactions than the block size capacity of Ethereum, a backlog of transactions will build up, and similarly in this case there is also guaranteed ordering of backlogged transactions. Due to these considerations, we defensively design the TC contract such that $\$G_{max}$-gas sustainability is attained for TC even if the Deliver transaction arrives after Cancel.

A number of example TC applications will now be described with reference to FIGS. 10, 11 and 12. These applications utilize authenticated data feeds implemented using the TC embodiment of FIG. 9.

Example 1: Financial Derivative (CashSettledPut)

Financial derivatives are among the most commonly cited smart contract applications, and exemplify the need for a data feed on financial instruments. We have implemented an example blockchain smart contract CashSettledPut for a cash-settled put option. This is an agreement for one party to buy an asset from the other at an agreed upon price on or before a particular date. It is "cash-settled" in that the sale is implicit, i.e., no asset changes hands, only cash reflecting the asset's value. In our implementation, the issuer of the option specifies a strike price $P_S$, expiration date, unit price $P_U$, and maximum number of units M the issuer is willing to sell. A customer may send a request to the contract specifying the number X of option units to be purchased and containing the associated fee ($X \cdot P_U$). A customer may then exercise the option by sending another request prior to the expiration date. CashSettledPut calls TC to retrieve the closing price $P_C$ of the underlying instrument on the day the option was exercised, and then pays the customer $X \cdot (P_S - P_C)$. To ensure sufficient funding to pay out, the contract is implemented with Ether value of at least $M \cdot P_S$.

FIG. 10 shows the detailed blockchain smart contract program for the above-described CashSettledPut application.

Example 2: Flight Insurance (FlightIns)

Flight insurance indemnifies a purchaser should the purchaser's flight be delayed or canceled. We have implemented a simple flight insurance blockchain smart contract called FlightIns. Our implementation utilizes TC's private-datagram feature to address a particular concern: customers may not wish to reveal their travel plans publicly on the blockchain.

In an embodiment of this type, a customer submits to $\mathcal{C}_{TC}$ a request $\text{Enc}_{pk_{TC}}(\text{req})$ encrypted under TC enclave's public key $pk_{TC}$. The enclave decrypts req and checks that it is well-formed (e.g., submitted sufficiently long before the flight time). The enclave will then fetch the flight information from a target website at a specified later time, and send to $\mathcal{C}_{TC}$ a datagram indicating whether the flight is delayed or canceled. Finally, to avoid leaking information through timing (e.g., when the flight information website is accessed or datagram sent), random delays are introduced.

More particularly, an insurer sets up FlightIns with a specified policy fee, payout, and lead time ΔT. (ΔT is set large enough to ensure that a customer can't anticipate flight cancellation or delay due to weather, etc.) To purchase a policy, a customer sends FlightIns a ciphertext C under the TC's pubic key $pk_{TC}$ of the International Civil Aviation Organization (ICAO) flight number FN and scheduled time of departure $T_D$ for the flight, along with the policy fee. FlightIns sends TC a private-datagram request containing the current time T and the ciphertext C. TC decrypts C and checks that the lead time meets the policy requirement, i.e., that $T_D - T \geq \Delta T$. TC then scrapes a flight information data source several hours after $T_D$ to check the flight status, and returns to FlightIns predicates on whether the lead time was valid and whether the flight has been delayed or canceled. If both predicates are true, then FlightIns returns the payout to the customer. Note that FN is never exposed in the clear.

Despite the use of private datagrams, FlightIns as described here still poses a privacy risk, as the timing of the predicate delivery by TC leaks information about $T_D$, which may be sensitive information; this, and the fact that the payout is publicly visible, could also indirectly reveal FN. FlightIns addresses this issue by including in the private datagram request another parameter $t > T_D$ specifying the time at which predicates should be returned. As indicated previously, by randomizing t and making $t - T_D$ sufficiently large, FlightIns can substantially reduce the leakage of timing information.

FIG. 11 shows the detailed blockchain smart contract program for the above-described FlightIns application.

Example 3: Steam Marketplace (SteamTrade)

Steam is an online gaming platform that supports thousands of games and maintains its own marketplace, where users can trade, buy, and sell games and other virtual items. We implement a blockchain smart contract for the sale of games and items for Ether that utilizes TC's support for custom datagrams through the use of Steam's access-controlled API. In this implementation, the seller sends $\text{Enc}_{pk_{TC}}$(account credentials, req) to a TC contract $\mathcal{C}_{TC}$, such that the enclave can log in as the seller and determine from the web-page whether the virtual item has been shipped.

A user intending to sell items creates a contract SteamTrade with the user's Steam account number $ID_S$, a list L of items for sale, a price P, and a ciphertext C under the TC's public key $pk_{TC}$ of the user's Steam API key. In order to purchase the list of items, a buyer first uses a Steam client to create a trade offer requesting each item in L. The buyer then submits to SteamTrade the buyer's Steam account number $ID_U$, a length of time $T_U$ indicating how long the seller has to respond to the offer, and an amount of Ether equivalent to the price P. SteamTrade sends TC a custom datagram containing the current time T, $ID_U$, $T_U$, L, and the encrypted API key C. TC decrypts C to obtain the API key, delays for time $T_U$, then retrieves all trades between the two accounts using the provided API key within that time period. TC verifies whether or not a trade exactly matching the items in L successfully occurred between the two accounts and returns the result to SteamTrade. If such a trade occurred, SteamTrade sends the buyer's Ether to the seller's account. Otherwise the buyer's Ether is refunded.

FIG. 12 shows the detailed blockchain smart contract program for the above-described SteamTrade application.

It is to be appreciated that the above examples of blockchain smart contracts utilizing TC authenticated data feeds are presented for purposes of illustration only, and should not be construed as limiting in any way.

We evaluated the performance of the example blockchain smart contracts of FIGS. 10, 11 and 12 utilizing an implementation of TC running on a Dell Inspiron 13-7359 laptop with an Intel i7-6500U CPU and 8.00 GB memory. We show that on this single host, this implementation of TC can easily process transactions at the peak global rate of Bitcoin, currently the most heavily loaded decentralized blockchain.

The TCB of the particular TC implementation in the present embodiment includes the enclave and TC contract. The enclave in this embodiment comprises approximately 46.4 k lines of C/C++ code, the vast majority of which (42.7 k lines) is the modified mbedTLS library (formerly known as PolarSSL) from ARM Limited. The source code of mbedTLS has been widely deployed and tested, while the remainder of the enclave codebase is small enough to admit formal verification. The TC contract is also compact; it comprises approximately 120 lines of Solidity code.

We measured the enclave response time for handling a TC request, defined as the interval between (1) the relay sending a request to the enclave and (2) the relay receiving a response from the enclave.

Table 2 below shows the enclave response time t, with profiling breakdown. All times are in milliseconds (ms). We executed 500 experimental runs, and report the statistics including the average (mean), proportion (%), maximum ($t_{max}$), minimum ($t_{min}$), and standard deviation ($\sigma_t$). Note that Total is the end-to-end response time as defined in Enclave Response Time. Times may not sum to this total due to minor unprofiled overhead.

TABLE 2

Enclave Response Time Statistics

CashSettledPut

|  | mean | % | $t_{max}$ | $t_{min}$ | $\sigma_t$ |
|---|---|---|---|---|---|
| Ctx. switch | 1.00 | 0.6 | 3.12 | 0.25 | 0.31 |
| Web scraper | 157 | 87.2 | 258 | 135 | 18 |
| Sign | 20.2 | 11.2 | 26.6 | 18.7 | 1.52 |
| Serialization | 0.40 | 0.2 | 0.84 | 0.24 | 0.08 |
| Total | 180 | 100 | 284 | 158 | 18 |

FlightIns

|  | mean | % | $t_{max}$ | $t_{min}$ | $\sigma_t$ |
|---|---|---|---|---|---|
| Ctx. switch | 1.23 | 0.24 | 2.94 | 0.17 | 0.32 |
| Web scraper | 482 | 95.4 | 600 | 418 | 31 |
| Sign | 20.5 | 4.0 | 25.3 | 18.9 | 1.4 |
| Serialization | 0.38 | 0.08 | 0.67 | 0.20 | 0.08 |
| Total | 505 | 100 | 623 | 439 | 31 |

SteamTrade

|  | mean | % | $t_{max}$ | $t_{min}$ | $\sigma_t$ |
|---|---|---|---|---|---|
| Ctx. switch | 1.17 | 0.20 | 3.25 | 0.36 | 0.35 |
| Web scraper | 576 | 96.2 | 765 | 489 | 52 |
| Sign | 20.3 | 3.4 | 24.8 | 18.8 | 1.28 |
| Serialization | 0.39 | 0.07 | 0.65 | 0.24 | 0.09 |
| Total | 599 | 100 | 787 | 510 | 52 |

Table 2 summarizes the total enclave response time as well as its breakdown over the 500 runs. For the three applications we implemented, the enclave response time ranges from 180 ms to 599 ms. The response time is clearly dominated by the web scraper time, i.e., the time it takes to fetch the requested information from a website. Among the three applications evaluated, SteamTrade has the longest web scraper time, as it interacts with the target website over multiple roundtrips to fetch the desired datagram.

We also performed a sequence of experiments measuring the transaction throughput while scaling up the number of concurrently running enclaves on our single SGX-enabled host from 1 to 20. 20 TC enclaves is the maximum possible given the enclave memory constraints on the specific machine model we used.

Figure 13:
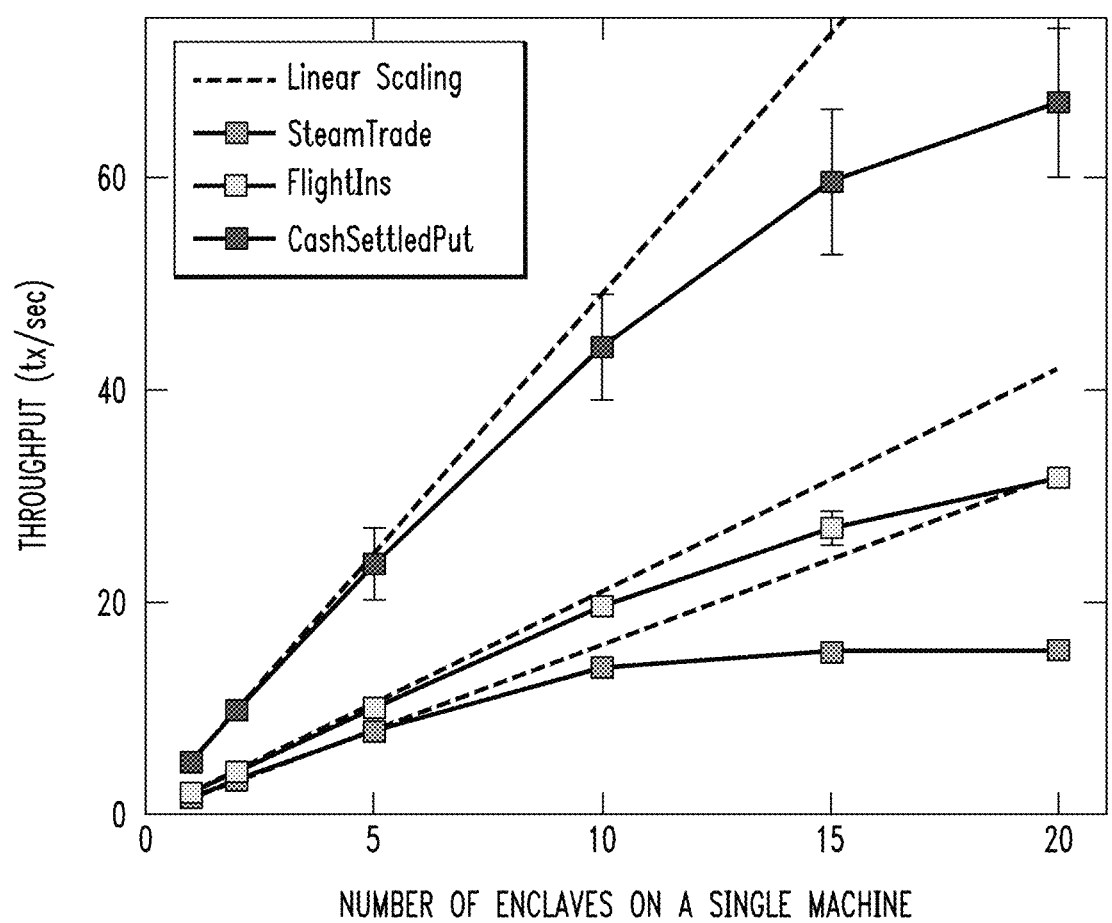
FIG. 13 shows a set of graphical plots illustrating throughput of a single machine as a function of the number of enclaves concurrently running on that machine in the applications of FIGS. 10, 11 and 12.

FIG. 13 shows throughput performance on a single SGX machine. The x-axis is the number of concurrent enclaves on the single machine and the y-axis is the throughput in number of tx/sec. Dashed lines indicate the ideal scaling for each application, and error bars, the standard deviation. We ran 20 rounds of experiments, with each round processing 1000 transactions in parallel. It is apparent from FIG. 13 that, for the three example applications evaluated, a single SGX machine can handle approximately 15 to 65 tx/sec.

Several significant data points show how effectively TC can serve the needs of today's blockchains for authenticated data: Ethereum currently handles under 1 tx/sec on average. Bitcoin today handles slightly more than 3 tx/sec, and its maximum throughput (with full block utilization) is roughly 7 tx/sec. We know of no measurement study of the throughput bound of the Ethereum peer-to-peer network. Recent work set forth in the above-cited K. Croman et al. reference indicates that Bitcoin cannot scale beyond 26 tx/sec without a protocol redesign. Thus, with few hosts TC can easily meet the data feed demands of even future decentralized blockchains.

With regard to Ethereum gas costs, currently 1 gas costs $5 \times 10^{-8}$ Ether, so assuming an exchange rate of $15 per Ether, $1 buys 1.3 million gas. Here we provide costs for our implementation components.

The callback-independent portion of Deliver costs about 35,000 gas (2.6¢), so this is the value of $\$G_{min}$. We set $\$G_{max}$=3,100,000 gas ($2.33), as this is approximately Ethereum's maximum GASLIMIT. The cost for executing Request is approximately 120,000 gas (9¢) of fixed cost, plus 2500 gas (0.19¢) for every 32 bytes of request parameters. The cost to execute Cancel is 62500 gas (4.7¢) including the gas cost $\$G_{encl}$ and the refund $\$G_0$ paid to TC should Deliver be called after Cancel.

The total callback-independent cost of acquiring a datagram from TC (i.e., the cost of the datagram, not the application) ranges from 11.9¢ (CashSettledPut) to 12.9¢ (SteamTrade). This SteamTrade cost is for 1 item. Each additional item costs 0.19. The variation results from differing parameter lengths.

As indicated previously, illustrative embodiments can implement techniques for component-compromise resilience. For example, for the CashSettledPut application, we implemented and evaluated two modes of majority voting:

2-out-of-3 majority voting within the enclave, providing robustness against data-source compromise. In our experiments the enclave performed simple sequential scraping of current stock prices from three different data sources: Bloomberg, Google Finance and Yahoo Finance. The enclave response time is roughly 1743 (109) ms in this case (c.f. 1058 (88), 423 (34) and 262 (12) ms for each respective data source). There is no change in gas cost, as voting is done inside the SGX enclave. Embodiments of this type may be configured to utilize parallelization of SGX's thread mechanism, assuming careful consideration of the security implications.

2-out-of-3 majority voting within the requester contract, which provides robustness against SGX compromise. We ran three instances of SGX enclaves, all scraping the same data source. In this scenario the gas cost would increase by a factor of 3 plus an additional 5.85¢.

So CashSettledPut would cost 35.6¢ for Deliver without Cancel. The extra 5.85 is the cost to store votes until a winner is known.

With regard to offline measurements, recall that an enclave in some embodiments utilizes a one-time setup operation that involves attestation generation. Setting up the TC enclave takes 49.5 (7.2) ms and attestation generation takes 61.9 (10.7) ms, including 7.65 (0.97) ms for the report, and 54.9 (10.3) ms for the quote.

Recall also that since clock( ) yields only relative time in SGX, TC's absolute clock is calibrated through an externally furnished wall-clock timestamp. A user can verify the correctness of the enclave absolute clock by requesting a digitally signed timestamp. This procedure is, of course, accurate only to within its end-to-end latency. Our experiments show that the time between Relay transmission of a clock calibration request to the enclave and receipt of a response is 11.4 (1.9) ms of which 10.5 (1.9) ms is to sign the timestamp. To this is added the wide-area network roundtrip latency, rarely more than a few hundred milliseconds.

It is to be appreciated that the TC embodiments described above are illustrative embodiments, and other embodiments can incorporate additional or alternative features. We will now describe examples of such features.

Some embodiments can include freeloading protection. There are concerns in the Ethereum community about "parasite contracts" that forward or resell datagrams from fee-based data feeds. See, e.g., K. Torpey, "The conceptual godfather of augur thinks the project will fail," CoinGecko, Aug. 5, 2015. As a countermeasure, illustrative embodiments can be configured to implement the following mechanism in TC, based in part on designated verifier proofs as described in M. Jakobsson et al., "Designated verifier proofs and their applications," Advances in Cryptology-EUROCRYPT '96, pp. 143-154, Springer, 2001. The set of n users $\mathcal{U} = \{U_1, \ldots, U_n\}$ of a requesting contract generate an (n,n)-secret-shared keypair (sk$\mathcal{U}$,pk$\mathcal{U}$). They submit their n individual shares to the TC enclave (e.g., as ciphertexts under pk$_{TC}$ sent to $\mathcal{C}_{TC}$).

TC now can sign datagrams using sk$\mathcal{U}$. Each user U$_i$ can be sure individually that a datagram produced by TC is valid, since the user did not collude in its creation. Potential parasitic users, however, cannot determine whether the datagram was produced by $\mathcal{C}_{TC}$ or by $\mathcal{U}$, and thus whether or not it is valid. Such a source-equivocal datagram renders parasite contracts less trustworthy and thus less attractive.

It is also possible for some embodiments to include revocation support functionality. There are two forms of revocation relevant to TC. First, the certificates of data sources may be revoked. Since TC already uses HTTPS, it could easily use the Online Certificate Status Protocol (OCSP) to check TLS certificates. Second, an SGX host could become compromised, prompting revocation of its EPID signatures by Intel. IAS will reportedly disseminate such revocations. Conveniently, clients already use IAS when checking the attestation $\sigma_{att}$, so revocation checking will require no modification to TC.

Some embodiments can be configured to hedge against SGX compromise. It was indicated above that TC can support majority voting across SGX hosts and data sources. Design enhancements to TC could reduce associated latency and gas costs. For SGX voting, one can implement a protocol in which multiple SGX-enabled TC hosts agree on a datagram value X via Byzantine consensus. The hosts may then use a threshold digital signature scheme to sign the datagram response from $\mathcal{W}_{TC}$, and each participating host can monitor the blockchain to ensure delivery.

As with any software, we may discover flaws in TC implementations or wish to add new functionality after an initial deployment. With TC as described above, however, updating prog$_{encl}$ would cause the enclave to lose access to sk$_{TC}$ and thus be unable to respond to requests in $\mathcal{C}_{TC}$. The TC operators could set up a new contract $\mathcal{C}'_{TC}$ referencing new keys, but this would be expensive and burdensome for TC's operators and users. While arbitrary code changes would be insecure, one could create a template for user contracts that includes a means to approve such software upgrades.

Some embodiments are configured to support generalized custom datagrams. In the SteamTrade example contract we demonstrated a custom datagram that scrapes a user's online account utilizing the user's credentials. A more generic approach would allow users to supply their own general-purpose code to TC and achieve inexpensive data-source-enriched emulation of private contracts in the blockchain model of the above-cited Kosba et al. reference. Placing such large requests on the blockchain would be prohibitively expensive, but code could be easily loaded into TC enclave off-chain. Of course, deploying arbitrary user code raises many security and confidentiality concerns which TC would need to address.

Illustrative embodiments disclosed herein include TC embodiments providing authenticated data feeds for Ethereum smart contracts. Some implementations of TC utilize SGX trusted hardware to serve datagrams with a high degree of trustworthiness.

In conjunction with the above description of illustrative embodiments, we defined gas sustainability, a critical availability property of Ethereum services, and provided techniques for shrinking the size of a hybrid TCB spanning the blockchain and an SGX. We have also shown in a formal model that TC serves only data from authentic sources, and that TC is gas sustainable and minimizes cost to honest users should the code behave maliciously.

In addition, in the above-described experiments involving end-to-end use of the system with the Ethereum blockchain, we demonstrated TC's practicality, cost effectiveness, and flexibility for three example applications.

TC embodiments disclosed herein offer a powerful, practical means to address the lack of trustworthy data feeds currently hampering Ethereum evolution, and support a rich range of applications.

Figure 14:
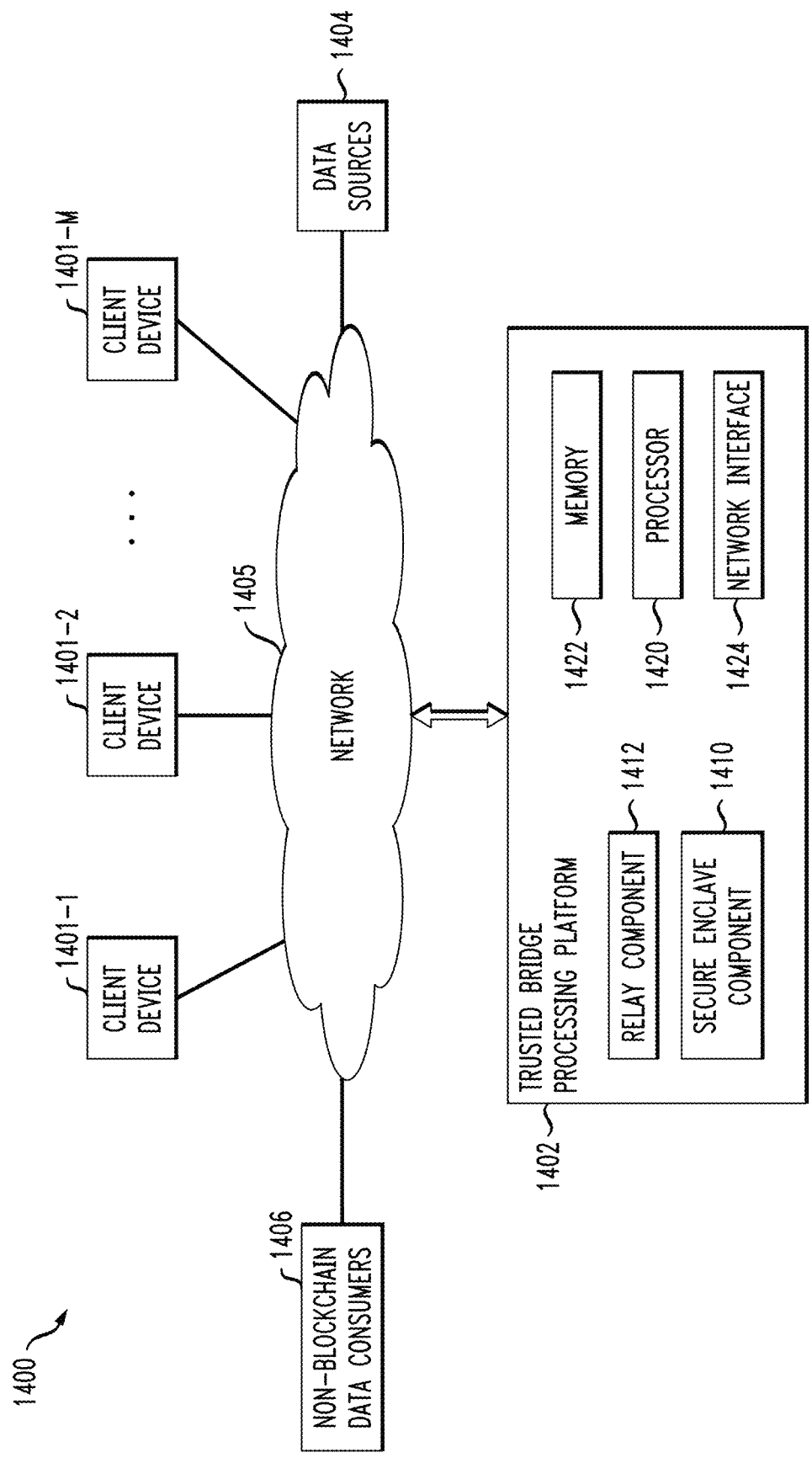
FIG. 14 shows an information processing system implementing an authenticated data feed for non-blockchain data consumers in another illustrative embodiment.

As indicated previously, TC can be adapted in a straightforward manner for use with other types of data consumers, including non-blockchain data consumers. FIG. 14 shows an information processing system 1400 in an illustrative embodiment of this type. The system 1400 comprises a trusted bridge processing platform 1402, also referred to as simply a "trusted bridge." The trusted bridge 1402 communicates with client devices 1401-1, 1401-2, . . . 1401-M and data sources 1404 over a network 1405. Also coupled to the network 1405 are non-blockchain data consumers 1406, each of which may comprise one or more non-blockchain processing devices.

The system 1400 is configured to provide authenticated data feeds serving authenticated data from the data sources 1404 to the non-blockchain data consumers 1406 via the trusted bridge 1402. The trusted bridge 1402 comprises a secure enclave component 1410 and a relay component 1412.

The secure enclave component 1410 in this embodiment is configured to receive a request for authenticated data via the relay component 1412 and to provide a response to the request via the relay component 1412, with the response being based at least in part on data obtained from a given one of the data sources 1404 via the relay component 1412. For example, the response can illustratively include the obtained data itself, or portions thereof, or data that is derived from the obtained data.

A given request for authenticated data may be received in the trusted bridge 1402 from one of the client devices 1401.

Such a request illustratively comprises encrypted user credentials. For example, the user credentials may be encrypted using a public key of the secure enclave component 1410. A corresponding secret key of the secure enclave component 1410 is securely held in trusted hardware of that component. In such an arrangement, the secure enclave component 1410 is more particularly configured to decrypt the user credentials and to utilize the user credentials to access a corresponding access-controlled user account of the given one of the data sources 1404 in order to obtain the data.

Although the encrypted credentials in the above-described arrangement are received in the secure enclave component as part of the request, other arrangements are possible. For example, the encrypted credentials may be received as part of a previous request, such as a load request that is followed by a web scraping request. Alternatively, portions of the encrypted credentials may be received in respective ones of a plurality of messages.

In addition, the illustrative embodiments are not limited to use with user credentials, and numerous other types of credentials can be supported, including by way of example the API keys mentioned elsewhere herein. References herein to "user credentials" should therefore be considered illustrative rather than limiting.

The secure enclave component 1410 may be configured to generate an attestation that is provided to one of the remote client devices 1401 via the relay component 1412. The attestation illustratively includes a public key of the secure enclave component 1410.

Additionally or alternatively, requests for authenticated data may be received in the trusted bridge 1402 from one of the non-blockchain data consumers 1406 over the network 105.

Responses to a given request may be delivered back the requesting system entity or to other designated system entities.

The trusted bridge 1402 further comprises a processor 1420, memory 1422 and network interface 1424, each configured in a manner similar to that previously described herein for respective corresponding elements of the FIG. 1 embodiment.

The secure enclave component 1410 and relay component 1412 illustratively implement various features, functionality and properties of similar components of other TC embodiments described herein, but without use of blockchain. For example, the components 1410 and 1412 can be configured for utilization in any of a wide variety of different contexts in which private or custom requests for authenticated data are desirable.

It is to be appreciated that the various embodiments disclosed herein are presented by way of illustrative example only, and should not be construed as limiting in any way. Numerous alternative arrangements for implementing authenticated data feeds for blockchains can be utilized in other embodiments.

Accordingly, the embodiments described above are considered illustrative only, and should not be viewed as limited to any particular arrangement of features. For example, those skilled in the art will recognize that alternative processing operations and associated system entity configurations can be used in other embodiments. It is therefore possible that other embodiments may include additional or alternative system entities, relative to the entities of the illustrative embodiments. Also, the particular messaging formats and other aspects of the illustrative protocols can be varied in other embodiments.

It should also be noted that the above-described information processing system arrangements are exemplary only, and alternative system arrangements can be used in other embodiments.

A given client, server, processor or other component in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA, a CPU, an ALU, a DSP, or other similar processing device component, as well as other types and arrangements of processing circuitry, in any combination. For example, a given cryptographic processing module of a processing device as disclosed herein can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, ROM, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with authenticated data feed processing as well as other related functionality.

Processing devices in a given embodiment can include, for example, laptop, tablet or desktop personal computers, mobile telephones, or other types of computers or communication devices, in any combination. For example, a computer or mobile telephone can be utilized by a user to access trusted bridge processing platforms providing authenticated data feeds as disclosed herein. These and other communications between the various elements of an information processing system comprising processing devices associated with respective system entities may take place over one or more networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of the system as disclosed herein can be implemented at least in part in the form of one or more software programs stored in memory and executed by a processor of a processing device. For example, certain functionality associated with secure enclave and relay components of a system can be implemented at least in part in the form of software.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts.

Thus, techniques illustrated in some embodiments herein in the context of providing authenticated data feeds in the context of Ethereum can be adapted in a straightforward manner for use in other contexts involving different types of blockchain processing, such as blockchain processing in the context of Bitcoin or other electronic currency systems, as well as in numerous non-blockchain contexts. Accordingly, illustrative embodiments of the invention should not be viewed as limited to any particular types of smart contracts, blockchains and/or electronic currencies or their associated processing contexts.

It is also to be appreciated that the particular process steps used in the embodiments described above are exemplary only, and other embodiments can utilize different types and arrangements of processing operations. For example, certain process steps shown as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of information processing systems, networks and devices than those utilized in the particular illustrative embodiments described herein, and in numerous alternative blockchain and non-blockchain processing contexts. In addition, the particular assumptions made herein in the context of describing certain embodiments need not apply in other embodiments. These and numerous other alternative embodiments will be readily apparent to those skilled in the art.

What is claimed is:

1. A system comprising:
a processing platform implementing a trusted bridge between one or more data sources and a smart contract program of a blockchain;
the trusted bridge comprising:
a secure enclave component comprising a hardware-based execution environment of the processing platform; and
a relay component configured to communicate over one or more networks via respective network interfaces of the processing platform;
wherein data obtained from a given one of the data sources via the relay component of the trusted bridge is authenticated in the secure enclave component of the trusted bridge;
said authentication comprising:
the secure enclave component establishing a transport layer security channel with the given data source via the relay component to obtain the data;
the secure enclave component applying a designated function to at least a portion of the obtained data; and
the secure enclave component generating an attestation of the obtained data based at least in part on: (i) a result of the application of the designated function, and (ii) cryptographic information exchanged with the given data source as part of the establishment of the transport layer security channel;
wherein information based at least in part on the data authenticated in the secure enclave component of the trusted bridge is provided to the smart contract program of the blockchain via the relay component of the trusted bridge; and
wherein the processing platform comprises at least one processing device having a processor coupled to a memory, said at least one processing device implementing the secure enclave component and the relay component of the trusted bridge of the processing platform.

2. The system of claim 1 wherein the information provided to the smart contract program of the blockchain via the relay component of the trusted bridge comprises one of:
at least a portion of the data authenticated in the secure enclave component of the trusted bridge; and
data derived from at least a portion of the data authenticated in the secure enclave component of the trusted bridge.

3. The system of claim 1 wherein at least a subset of the one or more data sources comprise respective HTTPS-enabled websites.

4. The system of claim 1 further comprising a plurality of blockchain processing devices and wherein the blockchain comprises one of a permissionless blockchain and a permissioned blockchain collectively maintained by the plurality of blockchain processing devices at least a subset of which are separate from the processing platform that implements the trusted bridge.

5. The system of claim 1 further comprising at least one additional processing device, separate from the processing platform that implements the trusted bridge, the at least one additional processing device implementing the smart contract program of the blockchain, and wherein the smart contract program of the blockchain comprises:
a user contract program; and
a trusted bridge contract program configured to communicate with the user contract program and further configured to communicate with the secure enclave component of the trusted bridge via the relay component of the trusted bridge.

6. The system of claim 5 wherein the at least one additional processing device comprises at least one processing device implementing instances of a first wallet program and a second wallet program different than the first wallet program, and wherein the user contract program and the trusted bridge contract program are configured to interface with the respective instances of the first wallet program and the second wallet program.

7. The system of claim 6 wherein the trusted bridge contract program receives one or more messages from the second wallet program wherein the one or more messages are secured utilizing a secret key accessible to the secure enclave component.

8. The system of claim 1 wherein the secure enclave component of the trusted bridge comprises an SGX-based secure enclave of said at least one processing device of the processing platform.

9. The system of claim 1 wherein the trusted bridge is implemented at least in part in the form of at least one server adapted for at least temporary coupling between the one or more data sources and the smart contract program of the blockchain.

10. The system of claim 1 wherein the trusted bridge is configured to communicate with at least one of the one or more data sources and the smart contract program of the blockchain via one or more networks.

11. The system of claim 1 wherein the relay component comprises:
a first interface configured to support communication with the given data source; and
a second interface configured to support communication with the smart contract program of the blockchain; the secure enclave component being configured to authenticate data obtained from the given data source via the first interface of the relay component;
wherein the information based at least in part on the data authenticated in the secure enclave component is provided to the smart contract program of the blockchain via the second interface of the relay component.

12. The system of claim 11 wherein the first interface of the relay component comprises a TCP interface.

13. The system of claim 1 wherein the secure enclave component is configured to receive a request for authenticated data from the smart contract program of the blockchain via the relay component and to provide a response to the request via the relay component wherein the response is based at least in part on the data authenticated in the secure enclave component.

14. The system of claim 13 wherein at least a portion of the request is encrypted by the smart contract program using a public key of the secure enclave component and wherein a corresponding secret key of the secure enclave component is securely held in trusted hardware of the secure enclave component.

15. The system of claim 13 wherein the request identifies at least a particular one of the data sources from which data to be authenticated by the secure enclave component is to be obtained via the relay component.

16. The system of claim 15 wherein the request identifies multiple distinct ones of the data sources from which data of a particular type is to be obtained via the relay component for authentication by the secure enclave component and wherein authentication by the secure enclave component is based at least in part on application of the designated function to at least portions of the data obtained from each of the multiple distinct data sources.

17. The system of claim 1 wherein the secure enclave component is configured to receive encrypted credentials and the secure enclave component decrypts the encrypted credentials and utilizes the decrypted credentials to obtain access to a corresponding access-controlled account of the given data source in order to obtain the data.

18. The system of claim 1 wherein the authenticated data from the secure enclave component is in the form of a datagram X comprising data obtained from a given data source Y for a specified time period T.

19. The system of claim 1 wherein the attestation generated by the secure enclave component is provided by the secure enclave component to a remote client device via the relay component and wherein the attestation includes a public key of the secure enclave component.

20. The system of claim 1 wherein the secure enclave component is one of a plurality of secure enclave components that collectively authenticate data obtained via at least one relay component of at least one trusted bridge and wherein the collective authentication by the plurality of secure enclave components is based at least in part on application of at least one additional function to individual authentications by respective ones of those secure enclave components.

21. A method comprising:
implementing a trusted bridge between one or more data sources and a smart contract program of a blockchain;
authenticating data from a given one of the data sources in a secure enclave component of the trusted bridge, the secure enclave component comprising a hardware-based execution environment of at least one processing device; and providing information based at least in part on the data authenticated in the secure enclave component to the smart contract program of the blockchain via a relay component of the trusted bridge, the relay component being configured to communicate over one or more networks via respective network interfaces of said at least one processing device;

said authenticating comprising:

the secure enclave component establishing a transport layer security channel with the given data source via the relay component to obtain the data;

the secure enclave component applying a designated function to at least a portion of the obtained data; and the secure enclave component generating an attestation of the obtained data based at least in part on: (i) a result of the application of the designated function, and (ii) cryptographic information exchanged with the given data source as part of the establishment of the transport layer security channel;

wherein the method is performed by said at least one processing device, said at least one processing device comprising a processor coupled to a memory.

22. The method of claim 21 wherein the secure enclave component is configured to receive a request for authenticated data from the smart contract program of the blockchain via the relay component and to provide a response to the request via the relay component wherein the response is based at least in part on the data authenticated in the secure enclave component.

23. The method of claim 22 wherein at least a portion of the request is encrypted by the smart contract program using a public key of the secure enclave component and wherein a corresponding secret key of the secure enclave component is securely held in trusted hardware of the secure enclave component.

24. A computer program product comprising a non-transitory processor-readable storage medium having stored therein program code of one or more software programs, wherein the program code when executed by at least one processing device causes said at least one processing device:

to implement a trusted bridge between one or more data sources and a smart contract program of a blockchain;

to authenticate data from a given one of the data sources in a secure enclave component of the trusted bridge, the secure enclave component comprising a hardware-based execution environment of said at least one processing device; and to provide information based at least in part on the data authenticated in the secure enclave component to the smart contract program of the blockchain via a relay component of the trusted bridge, the relay component being configured to communicate over one or more networks via respective network interfaces of said at least one processing device;

said authentication comprising:

the secure enclave component establishing a transport layer security channel with the given data source via the relay component to obtain the data;

the secure enclave component applying a designated function to at least a portion of the obtained data; and the secure enclave component generating an attestation of the obtained data based at least in part on: (i) a result of the application of the designated function, and (ii) cryptographic information exchanged with the given data source as part of the establishment of the transport layer security channel.

25. The computer program product of claim 24 wherein the secure enclave component is configured to receive a request for authenticated data from the smart contract program of the blockchain via the relay component and to provide a response to the request via the relay component wherein the response is based at least in part on the data authenticated in the secure enclave component.

26. The computer program product of claim 25 wherein at least a portion of the request is encrypted by the smart contract program using a public key of the secure enclave component and wherein a corresponding secret key of the secure enclave component is securely held in trusted hardware of the secure enclave component.

* * * * *